(12) United States Patent
Uchida et al.

(10) Patent No.: US 10,747,220 B2
(45) Date of Patent: Aug. 18, 2020

(54) AUTONOMOUS DRIVING CONTROL APPARATUS

(71) Applicant: Hitachi Automotive Systems, Ltd., Hitachinaka-shi, Ibaraki (JP)

(72) Inventors: Naokazu Uchida, Tokyo (JP); Taisetsu Tanimichi, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 48 days.

(21) Appl. No.: 15/540,589

(22) PCT Filed: Jan. 26, 2016

(86) PCT No.: PCT/JP2016/052062
§ 371 (c)(1),
(2) Date: Jun. 29, 2017

(87) PCT Pub. No.: WO2016/121710
PCT Pub. Date: Aug. 4, 2016

(65) Prior Publication Data
US 2018/0088572 A1 Mar. 29, 2018

(30) Foreign Application Priority Data
Jan. 28, 2015 (JP) .................................. 2015-013893

(51) Int. Cl.
*G05D 1/00* (2006.01)
*B60W 50/14* (2020.01)
(Continued)

(52) U.S. Cl.
CPC .......... *G05D 1/0061* (2013.01); *B60W 10/04* (2013.01); *B60W 10/18* (2013.01); *B60W 10/20* (2013.01);
(Continued)

(58) Field of Classification Search
CPC ......... G05D 1/0061; G05D 2201/0213; G05D 1/0088; B60W 50/14; B60W 2050/0072;
(Continued)

(56) References Cited

U.S. PATENT DOCUMENTS 7,894,951 B2 * 2/2011 Norris ..................... H04L 67/12
180/443
8,352,110 B1 1/2013 Szybalski et al.
(Continued)

FOREIGN PATENT DOCUMENTS

DE 10 2013 009 339 A1 12/2014
FR 3 005 925 A1 11/2014
(Continued)

OTHER PUBLICATIONS

International Search Report (PCT/ISA/210) issued in PCT Application No. PCT/JP2016/052062 dated Apr. 5, 2016 with English translation (6 pages).

(Continued)

*Primary Examiner* — Truc M Do
(74) *Attorney, Agent, or Firm* — Crowell & Moring LLP

(57) ABSTRACT

It is an object of the present invention to switch driving modes smoothly and ensure that a passenger understands driving operations controlled in the relevant driving mode and necessary driving operations. An autonomous driving control apparatus capable of switching between a manual driving mode which requires driving operation by a passenger of a vehicle, and an autonomous control mode which does not require the driving operation by the passenger of the vehicle is provided, wherein the autonomous driving control apparatus includes: an autonomous driving control unit that controls the vehicle in the autonomous control mode; and an information notification unit that gives notice to the passenger of the vehicle, wherein when the driving (Continued)

operation by the passenger is required after switching from the autonomous control mode to the manual driving mode, the autonomous driving control unit performs first notice control to cause the information notification unit to give notice that the driving operation by the passenger is required.

6 Claims, 9 Drawing Sheets

(51) Int. Cl.
  *B60W 30/16* (2020.01)
  *B60W 10/18* (2012.01)
  *B60W 50/16* (2020.01)
  *B60W 10/20* (2006.01)
  *B60W 30/10* (2006.01)
  *B60W 30/182* (2020.01)
  *B60W 10/04* (2006.01)
  *B60W 50/08* (2020.01)

(52) U.S. Cl.
  CPC .......... *B60W 30/10* (2013.01); *B60W 30/16* (2013.01); *B60W 30/182* (2013.01); *B60W 50/082* (2013.01); *B60W 50/14* (2013.01); *B60W 50/16* (2013.01); *G05D 1/0088* (2013.01); *B60W 2050/146* (2013.01); *B60W 2554/00* (2020.02); *B60W 2556/50* (2020.02); *B60W 2720/106* (2013.01); *B60W 2720/125* (2013.01); *G05D 2201/0213* (2013.01)

(58) Field of Classification Search
  CPC ....... B60W 2050/146; B60W 2540/18; B60W 2550/10; B60W 30/00; B60W 30/14; B60W 30/182; B60W 50/082; B60K 35/00; B60K 28/066; B60R 25/25; B62D 15/025; G08G 1/00
  USPC ...................................................... 701/2, 41
  See application file for complete search history.

(56) References Cited

U.S. PATENT DOCUMENTS

| | | | | |
|---|---|---|---|---|
| 8,818,608 B2* | 8/2014 | Cullinane | ............ | B60W 30/00 701/23 |
| 9,342,074 B2* | 5/2016 | Dolgov | ................ | G05D 1/0061 |
| 9,878,723 B2* | 1/2018 | Kim | ..................... | G05D 1/0061 |
| 10,007,264 B2* | 6/2018 | Zhu | ....................... | B60W 50/08 |
| 10,065,656 B2* | 9/2018 | Otsuka | ................. | G05D 1/0061 |
| 2012/0101660 A1* | 4/2012 | Hattori | ................. | G05D 1/0022 701/2 |
| 2013/0046431 A1 | 2/2013 | Becker et al. | | |
| 2014/0156133 A1* | 6/2014 | Cullinane | ............. | B60W 30/00 701/23 |
| 2014/0156134 A1* | 6/2014 | Cullinane | ............ | G05D 1/0223 701/23 |
| 2014/0303827 A1* | 10/2014 | Dolgov | ................. | B60W 50/10 701/23 |
| 2016/0103449 A1 | 4/2016 | Desnoyer et al. | | |
| 2016/0132054 A1 | 5/2016 | Eigel | | |
| 2016/0185387 A1* | 6/2016 | Kuoch | ................... | B60K 35/00 701/41 |
| 2016/0207537 A1* | 7/2016 | Urano | ................. | B60W 30/182 |
| 2016/0362116 A1* | 12/2016 | Otsuka | ................. | G05D 1/0061 |
| 2017/0008490 A1* | 1/2017 | Sako | .................... | G07C 9/00571 |
| 2017/0123423 A1* | 5/2017 | Sako | ........................ | G08G 1/00 |
| 2017/0225567 A1* | 8/2017 | Tsuda | ..................... | B60K 35/00 |
| 2017/0294120 A1* | 10/2017 | Ootsuji | ................. | B60K 28/066 |
| 2017/0341648 A1* | 11/2017 | Sanma | .................. | B60W 30/14 |
| 2017/0361853 A1* | 12/2017 | Nagy | .................... | B60W 50/14 |
| 2017/0364070 A1* | 12/2017 | Oba | ..................... | B60W 50/08 |

FOREIGN PATENT DOCUMENTS

| | | |
|---|---|---|
| JP | 2007-307927 A | 11/2007 |
| JP | 2013-517980 A | 5/2013 |
| JP | 2014-108771 A | 6/2014 |
| JP | 2015-182525 A | 10/2015 |

OTHER PUBLICATIONS

Japanese-language Written Opinion (PCT/ISA/237) issued in PCT Application No. PCT/JP2016/052062 dated Apr. 5, 2016 (5 pages).
Partial Supplementary European Search Report issued in counterpart European Application No. 16743313.5 dated Aug. 16, 2018 (sixteen (16) pages).
Vlakveld W., "Transition of Control in Highly Automated Vehicles, A Literature Review" SWOV Institute for Road Safety Research, 2015, pp. 1-30, Publication R-2015-22, Netherlands, XP055495341 (32 pages).

\* cited by examiner

AUTONOMOUS DRIVING CONTROL APPARATUS

TECHNICAL FIELD

The present invention relates to an autonomous driving control apparatus.

BACKGROUND ART

U.S. Pat. No. 8,352,110 (PTL 1) describes an autonomous driving control system which aims at achieving smooth switching between autonomous driving and manual driving, wherein the system judges whether the system can start autonomous driving or not in response to a passenger's operation to start the autonomous driving, and then responds to the passenger; and when the passenger approves the response, the system starts the autonomous driving; and during the autonomous driving, the system causes a light emitting apparatus on a steering to emit light, thereby showing that the autonomous driving is being performed.

CITATION LIST

Patent Literature

PTL 1: U.S. Pat. No. 8,352,110

SUMMARY OF THE INVENTION

Problems to be Solved by the Invention

The autonomous driving control system described in PTL 1 is configured so that when cancelling the autonomous driving, it is judged that the passenger has touched a steering wheel, and then the autonomous driving is switched to the manual driving; however, no consideration is given to whether the passenger has started any driving operation or not. Even if the passenger has touched the steering wheel, the passenger may not be necessarily ready enough to perform the driving operation.

Furthermore, regarding the autonomous driving control system described in PTL 1, an autonomous driving mode to autonomously control all driving operations is described. However, when a driving assist mode to autonomously control only some driving operations exists in addition to the above-mentioned modes and unless the passenger sufficiently understands the content controlled by the autonomous driving in each mode, there is fear that the passenger may perform the driving operations against control of each mode and the condition of a vehicle may become unstable, or there is fear that the passenger may fail to perform the driving operations, which are not controlled in each mode, and the vehicle may not be controlled.

Means to Solve the Problems

In order to solve the above-described problems, for example, provided is an autonomous driving control apparatus capable of switching between a manual driving mode which requires driving operation by a passenger of a vehicle, and an autonomous control mode which does not require the driving operation by the passenger of the vehicle, wherein the autonomous driving control apparatus includes: an autonomous driving control unit that controls the vehicle in the autonomous control mode; and an information notification unit that gives notice to the passenger of the vehicle, wherein when the driving operation by the passenger is required after switching from the autonomous control mode to the manual driving mode, the autonomous driving control unit performs first notice control to cause the information notification unit to give notice that the driving operation by the passenger is required.

Advantageous Effects of the Invention

It is an object of the present invention to give notices to the passenger in order to make them understand a current driving mode, driving operations to be controlled, or necessary driving operations.

DESCRIPTION OF EMBODIMENTS

Embodiment 1

Figure 1:
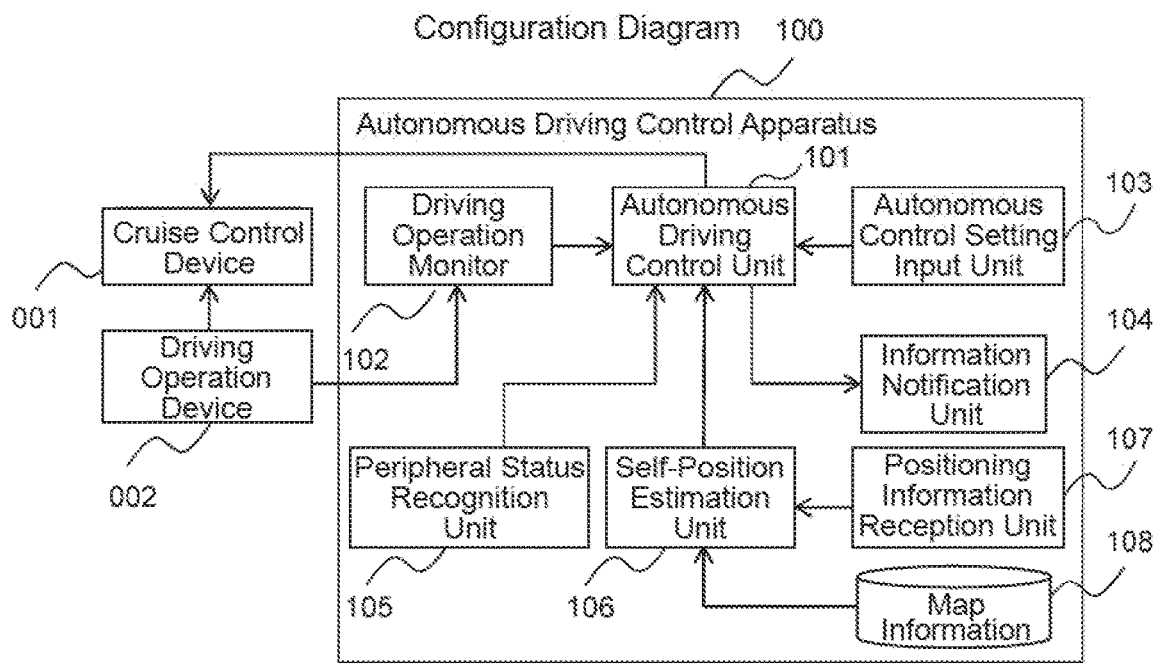
FIG. 1 is a diagram illustrating an example of the configuration of an autonomous driving control apparatus 100.

A configuration example of an autonomous driving control apparatus 100 according to a first embodiment of the present invention will be explained. FIG. 1 illustrates the configuration example of the autonomous driving control apparatus 100 according to the first embodiment of the present invention. The autonomous driving control apparatus 100 is an apparatus including an arithmetic processing unit and a memory which are required to perform autonomous driving control.

A cruise control device 001 is connected to a drive unit such as an engine and a motor of a vehicle, which are not illustrated in the drawing, as well as a braking device, a steering device, an actuator for moving them, and a steering motor and has a function that receives instructions from a driving operation device 002 or the autonomous driving control apparatus 100 and control them. The autonomous driving control apparatus 100 can control driving of the vehicle without a passenger's driving operations. When the vehicle runs by means of the passenger's driving operations, the cruise control device 001 controls the vehicle according to a signal from the driving operation device 002. When the vehicle runs by means of autonomous driving, the cruise control device 001 controls the vehicle according to a signal from the autonomous driving control apparatus 100.

The driving operation device 002 is a device for operating the cruise control device 001 and is a device having a function that transmits the passenger's driving operations of a steering wheel, an accelerator pedal, a brake pedal, a shift lever, and so on to the cruise control device 001. Incidentally, it is only necessary for the passenger to be able to perform the vehicle driving operations and objects to be operated do not necessarily have to be the steering wheel, the accelerator pedal, and the brake pedal with which a general vehicle is equipped. For example, a lever-type device may be used if equivalent operations can be performed.

The autonomous driving control apparatus 100 includes an autonomous driving control unit 101, a driving operation monitor 102, an autonomous control setting input unit 103, an information notification unit 104, a peripheral status recognition unit 105, a self-position estimation unit 106, a positioning information reception unit 107, and map information 108 and is connected to the cruise control device 001 and the driving operation device 002. The autonomous driving control apparatus 100 has: a function that issues instructions to the cruise control device 001 and controls driving of the vehicle without the passenger's operations; and a function that assists the driving operations by performing some of the driving operations by the passenger.

The driving operation monitor 102 monitors the status of the driving operation device 002 and monitors whether the passenger is operating the driving operation device 002 or not. For example, regarding the accelerator and the brake, the driving operation monitor 102 monitors a pressing amount of the pedals; and regarding the steering wheel, the driving operation monitor 102 monitors a steering angle, a running torque, and whether the passenger is touching the steering wheel or not. The driving operation monitor 102 monitors the driving operation device 002 by receiving each control signal of the driving operation device 002 or separately installing a sensor for detecting an operated amount.

The autonomous control setting input unit 103 is a device for switching between various autonomous control modes and setting autonomous control settings of a destination, a route, a driving speed, and so on and is a device having a function that transmits the passenger's operations of, for example, physical input devices such as buttons and a touch panel input device as well as gesture input devices by means of a camera and an infrared sensor, to the autonomous driving control unit 101.

The information notification unit 104 is a device for informing the passenger of the status of various driving assist functions and an autonomous driving function, which are reported from the autonomous driving control unit 101. The information notification unit 104 interprets notices from the autonomous driving control unit 101 and gives various notices and guiding information to the passenger by using previously stored message data, image data, voice data, or sound effects and light emitting pattern data according to the notices. A device that actually issues notices is composed of, for example, a display such as an LCD (Liquid Crystal Display) or an organic EL (Electroluminescence), a light emitting device such as an LED, and a sound output device such as a speaker.

The peripheral status recognition unit 105 is a device having a function that recognizes a road shape by detecting white lines ahead of the vehicle and road edges and recognizes vehicles, pedestrians, and obstacles around the vehicle, and is composed of, for example, a camera, a radar, and an ultrasonic sensor.

The positioning information reception unit 107 has a function that specifies a position by receiving radio waves from a positioning satellite such as a GPS (Global Positioning System). Incidentally, the positioning system to be used is not limited to GPS and may be configured so that it can receive radio waves from other positioning systems and correction radio waves. If the positioning system can receive the correction radio waves, it is possible to estimate the position with higher accuracy.

The map information 108 is detailed map information including road information to be used for the autonomous driving control. The map information 108 includes information about road shapes such as curvatures of curves, slopes, intersections, branch shapes, the number of lanes, and road widths, speed limit information, and road type information indicative of whether general roads or expressways. The map information 108 may be recorded in an embedded recording medium such as an HDD (Hard Disk Drive) or an SSD (Solid State Drive) or may be recorded in an external recording medium such as a flash memory or an optical disc and read by using an interface which is not illustrated in the drawing.

The self-position estimation unit 106 is a device having a function that estimates a traveling position of the vehicle and the road information about a road on which the vehicle is traveling by correcting a positioning result of the positioning information reception unit 107 on the basis of the gyro sensor and information about the speed of the vehicle and comparing the corrected positioning result with the map information 108.

The driving assist mode conducted by the autonomous driving control apparatus 100 includes cruise control, adaptive cruise control, and lane-keeping assist and the autonomous driving mode includes autonomous driving and autonomous parking. The passenger can select any arbitrary driving assist mode or autonomous driving mode and execute it. Regarding the lane-keeping assist and the adaptive cruise control, both of their functions can be used at the same time. Furthermore, regarding the adaptive cruise control, when the peripheral status recognition unit 105 judges that a preceding vehicle cannot be recognized sufficiently as will be explained in S302 of FIG. 3, the adaptive cruise control can be made to function as the cruise control.

[Notice Control Processing for Cruise Control]

Figure 2:
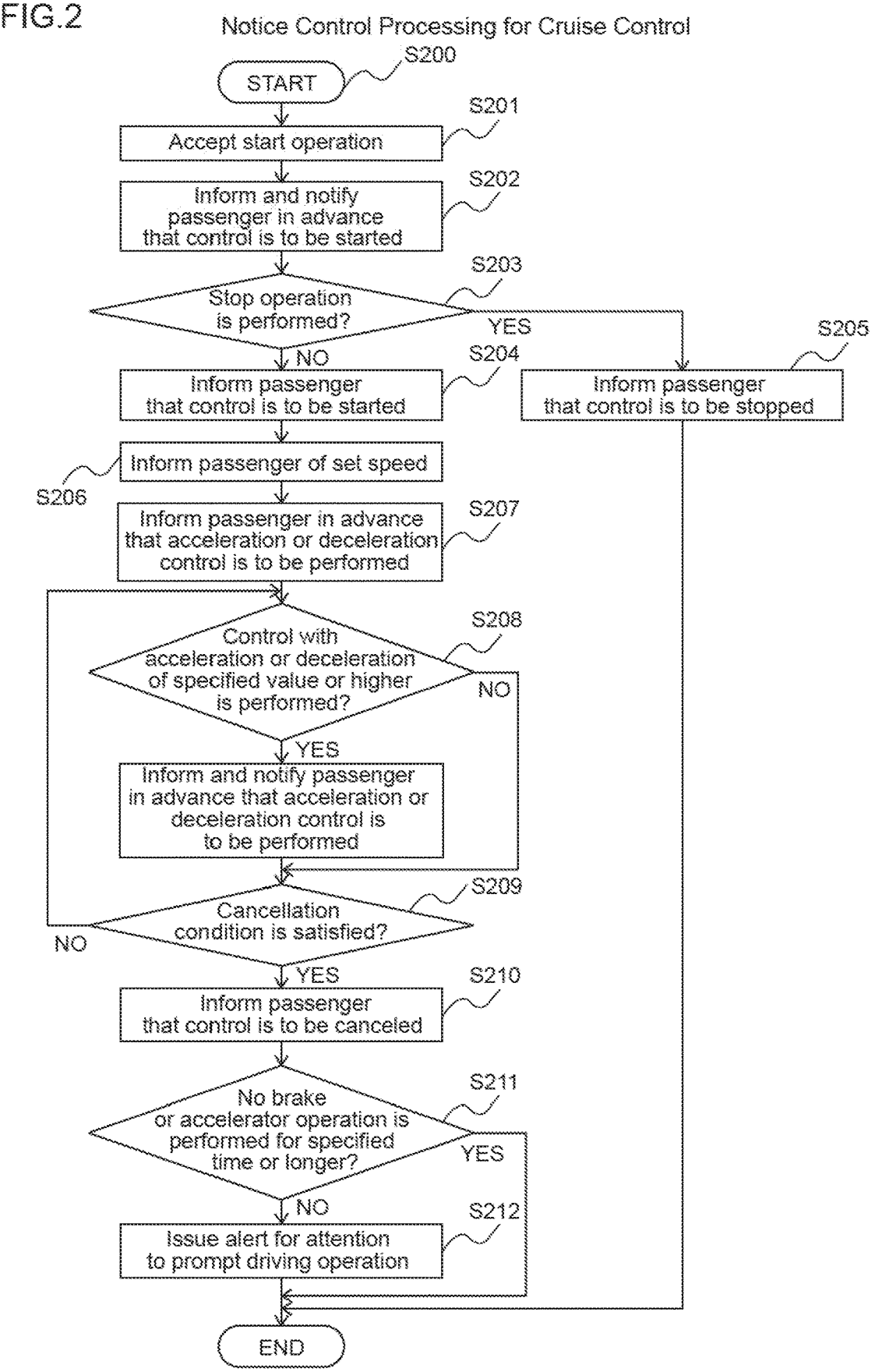
FIG. 2 is an example of a flowchart for explaining notice control processing for cruise control.

FIG. 2 illustrates a flowchart for explaining notice control processing associated with the cruise control performed by the autonomous driving control apparatus 100. The cruise control is control to maintain a preset speed and is autonomous control limited to speed control. Steering will not be controlled and the passenger needs to perform steering. Incidentally, if functions are limited to the cruise control, a configuration without the peripheral status recognition unit 105 may be employed. Regarding the notice control processing, when the cruise control is started according to a cruise control start instruction from the autonomous control setting input unit 103, the passenger is notified that the speed control is to be performed by the cruise control. Incidentally, in this embodiment, all notices and guiding information are given as the autonomous driving control unit 101 conducts the notice control of the information notification unit 104 and the information notification unit 104 displays the notices and guiding information and outputs voices for the notices and guiding information according to the notice control.

When the autonomous control setting input unit 103 issues an instruction to start the cruise control (S201), the autonomous driving control unit 101 notifies the passenger via the information notification unit 104 that the cruise control will be started within a specified time (S202). Furthermore, at the same time, the autonomous driving control unit 101 informs the passenger, as control content of the cruise control, that: the speed control will be performed so as to maintain a set speed; deceleration control will not be performed even if the vehicle approaches a preceding vehicle; and the passenger needs to perform the deceleration operation.

Accordingly, when the passenger has mistakenly started the cruise control or when the passenger intended to select another autonomous control, but has mistakenly selected the cruise control, the passenger can notice their mistake immediately and start the stop operation (S203: YES). When the stop operation is not performed within a specified time (S203: NO), the autonomous driving control unit 101: informs the passenger that the cruise control is to be started (S204); and then starts the cruise control. Regarding the information of the start, the passenger is notified of a set speed (S206).

While the stop operation is being accepted, the time it takes to switch is presented by indicating the remaining time by countdown display or changing a display color or sound according to the remaining time. Furthermore, regarding this time to wait for the stop operation, sufficient time to allow the passenger to stop the switching should be secured and, for example, about five seconds should be provided. It may be designed so that the passenger can arbitrarily set the time it takes to switch.

Furthermore, the passenger is also informed whether the vehicle will be accelerated or decelerated immediately after starting control (S207). For example, when the current driving speed is lower than the set speed, the acceleration control is performed by the cruise control. On the other hand, when the current driving speed is higher than the set speed, the deceleration control is performed by the cruise control. Incidentally, the passenger may be informed of the set speed and a method for changing the setting.

Informing the passenger in this manner can prevent the passenger from feeling uncomfortable after starting the cruise control on the passenger's own will, which might result in acceleration or deceleration against the passenger's expectations because the set speed is higher or lower than an intended value.

The cruise control does not perform the deceleration control caused by approaching of the preceding vehicle; however, the deceleration control is performed when the speed increases because of, for example, a downhill grade. Therefore, in such a case, the passenger is informed that the deceleration control is to be performed in response to acceleration on the downhill grade. On the other hand, when the acceleration control is to be performed in response to deceleration on an uphill grade, the passenger is informed that such acceleration control is to be performed.

When the slope of the road suddenly changes significantly, the acceleration or deceleration control may possibly become drastic. So, by notifying the passenger to that effect in advance, the passenger will be able to feel safe with the autonomous control. Whether the notice should be made or not is judged according to the degree of acceleration or deceleration determined by the autonomous driving control unit 101; and the notice does not have to be made as long as the acceleration or deceleration is within a specified range. For example, the passenger is notified only when control with predicted acceleration of 0.1 G or more is to be performed (S208).

When a cancellation condition is satisfied by the passenger's cancellation operation or brake operation and the cruise control thereby terminates (S209: YES), the passenger is informed of termination of the speed control by means of the cruise control and the passenger is informed and prompted to perform the accelerator or brake operation by themselves (S210). Furthermore, when the accelerator or brake operation is not performed after the cancellation of the cruise control and deceleration or acceleration caused by the downhill grade continues (S211: NO), the passenger is notified and prompted again to drive the vehicle (S212). On the other hand, when the cancellation condition is not satisfied (S209: NO), the processing returns to S208 and the autonomous driving control unit 101 judges whether or not it is necessary to notify the passenger in advance that the acceleration or deceleration control is to be performed.

The timing when to give the notice is, for example, when neither the accelerator operation nor the brake operation is performed for five seconds or longer after the cancellation of control. Informing the passenger in this manner prevents the passenger from mistakenly recognizing continuation of the autonomous control of the vehicle and thereby failing to perform the driving operation. Particularly, acceleration caused by the downhill grade is dangerous. So, when neither the accelerator operation nor the brake operation is performed regardless of acceleration, a strong warming is given by, for example, setting off an alarm. Furthermore, when it is found by the self-position estimation unit 106 that the road on which the vehicle is running has a downhill grade, the passenger is informed, before cancelling the cruise control, that the vehicle may possibly accelerate due to the downhill grade.

[Notice Control Processing for Adaptive Cruise Control]

Figure 3:
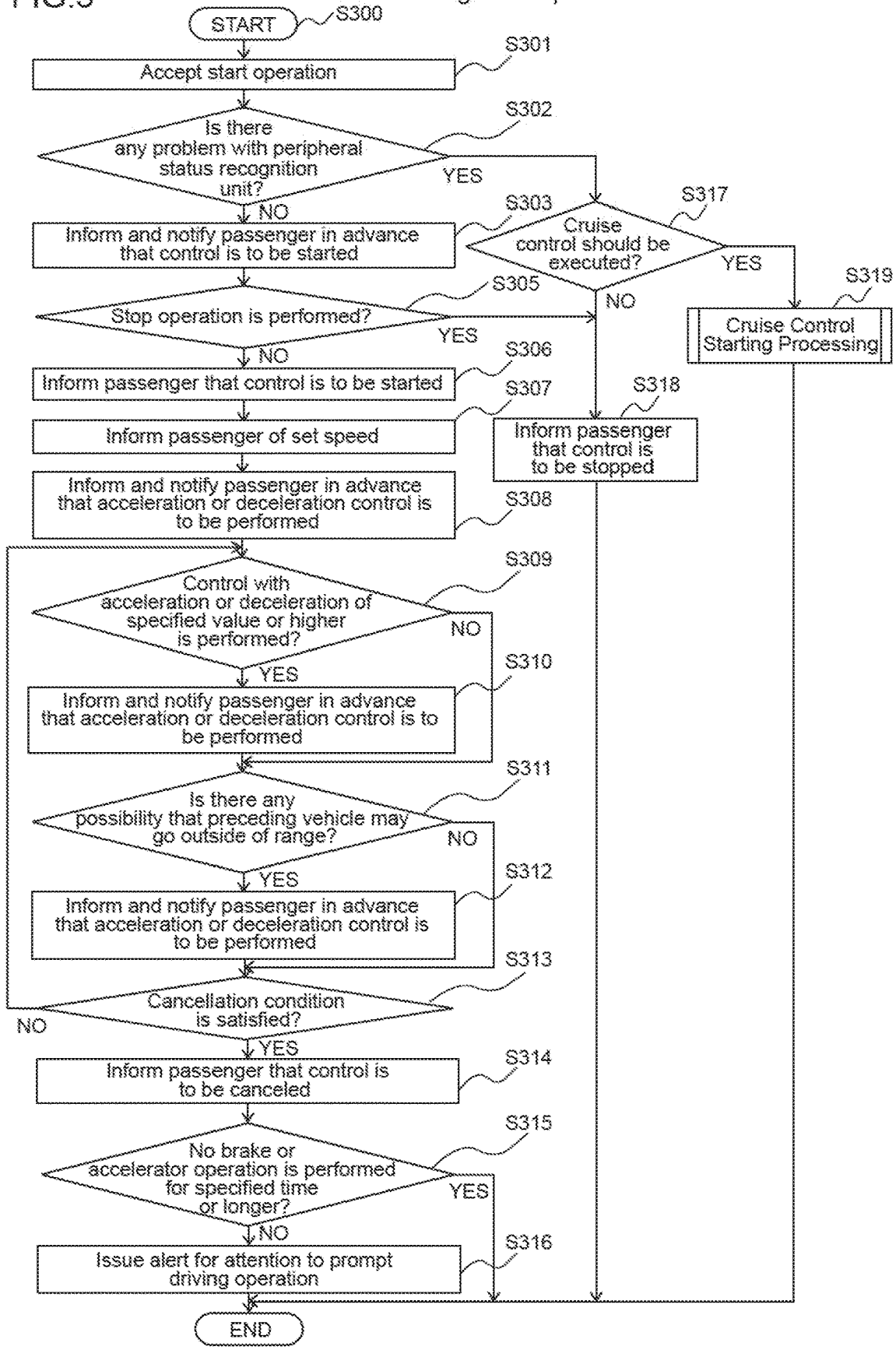
FIG. 3 is an example of a flowchart for explaining the notice control processing for adaptive cruise control.

FIG. 3 illustrates a flowchart for explaining the notice control processing associated with the adaptive cruise control performed by the autonomous driving control apparatus 100. The adaptive cruise control is to: autonomously decelerate by having the peripheral status recognition unit 105 detect a preceding vehicle when the preceding vehicle becomes closer; and accelerate again to return to the set speed when the preceding vehicle no longer exists. The basic flowchart of the notice control processing for the adaptive cruise control is close to the notice control processing for the cruise control, but the content of the notice and the notice timing are slightly different.

Firstly, at the time of starting the processing, the passenger is informed that the speed control is to be performed according to whether a preceding vehicle exists or not, in addition to the content of the notice upon staring the cruise control. In order for the adaptive cruise control to operate, the peripheral status recognition unit 105 is required to operate normally. For example, when it is judged that the peripheral status recognition unit 105 cannot recognize the preceding vehicle sufficiently due to, for example, fog (S302: YES), the passenger is notified: that the active cruise control cannot be executed because the peripheral status recognition unit 105 fails to function sufficiently; and whether to switch to the cruise control or not (S317).

On the other hand, when the autonomous control setting input unit 103 receives input to approve switching to the cruise control (S317: YES), control of the cruise control is started (S319). On the other hand, when input to reject switching to the cruise control is made (S317: NO), the passenger is informed that the processing is to be stopped (S318) and the processing is terminated. Incidentally, the processing may be terminated without informing the passenger of switching to the cruise control at the point in time when the peripheral status recognition unit 105 does not function sufficiently.

When the adaptive cruise control is started, the autonomous driving control unit 101 notifies the passenger, via the information notification unit 104, that the adaptive cruise control is to be started within a specified time (S303). Under this circumstance, the passenger is informed, as the control content, that the speed of the vehicle will be controlled to maintain the set speed and will be decelerated in accordance with the speed of a preceding vehicle when the passenger's vehicle comes closer to the preceding vehicle.

Accordingly, when the passenger has mistakenly started the adaptive cruise control or when the passenger intended to select another autonomous control, but has mistakenly selected the adaptive cruise control, the passenger can notice their mistake immediately and start the stop operation (S305). When the stop operation is not performed within a specified time (S305: NO), the passenger is informed that the adaptive cruise control is to be started (S306), and then the adaptive cruise control is started. Under this circumstance, the passenger is also informed of the set speed (S307).

Furthermore, just like the cruise control, the passenger is informed of whether the vehicle will be accelerated or decelerated immediately after starting control (S308). Under this circumstance, in addition to the information indicating whether to accelerate or decelerate, the reason why the control is to be performed, for example, whether a preceding vehicle exists or not, may be explained in detail. For example, the passenger is informed that: the set speed is 80 km/h; however, since there is a preceding vehicle, the passenger's vehicle is running at 70 km/h along with the preceding vehicle. Particularly, when the preceding vehicle no longer exists and the acceleration control is to be performed to accelerate to the set speed, the passenger is notified that the speed is to be accelerated to the set speed of 80 km/h.

Then, when there is a possibility that drastic acceleration control may be performed due to a sudden significant change of the slope of the road, the passenger is notified of this in advance (S309, S310). Regarding the notice of the acceleration control, whether to give the notice or not is judged according to the degree of acceleration or deceleration determined by the autonomous driving control unit 101; and if the acceleration or deceleration is within a specified range, the notice does not have to be given. For example, the passenger is notified only when control with predicted acceleration of 0.1 G or more is to be performed.

When the vehicle runs at a speed lower than the set speed by following the preceding vehicle for long time and then the preceding vehicle is gone and the acceleration control is performed to accelerate to the set speed, there is a possibility that the passenger may feel disturbed by the sudden acceleration. So, explaining the reason for the control in this manner can expect the effect of making the passenger feel more safe and comfortable with the autonomous control.

Furthermore, the range within which the peripheral status recognition unit 105 can recognize the preceding vehicle is often narrower than the range of recognition by the passenger. So, for example, in a case of a sharp curve or a steep-gradient hill, the passenger may be able to recognize the preceding vehicle, but the preceding vehicle may sometimes be out of the range recognized by the peripheral status recognition unit 105. In such a case, the acceleration control which is not expected by the passenger will be performed, so that the passenger may possibly feel disturbed. Therefore, when the self-position estimation unit 106 detects that the vehicle is approaching to the sharp curve or the steep gradient (S311: YES), the passenger may be informed in advance that there is a possibility of occurrence of the acceleration control in despite of the existence of the preceding vehicle (S312).

When the cancellation condition is satisfied and the adaptive cruise control is thereby to be terminated, for example, because of the passenger's cancellation operation, steering operation, or brake operation, or because the peripheral status recognition unit 105 can no longer recognize vehicles ahead due to the weather or other reasons (S313: YES), the passenger is informed that the control is to be terminated, and the passenger is informed and prompted to perform the accelerator or brake operation (S314). Furthermore, when the accelerator or brake operation is not performed after the cancellation and the deceleration or the acceleration caused by the downhill grade continues (S315: NO), the passenger is notified and prompted again to drive the vehicle (S316). On the other hand, when the cancellation condition is not satisfied (S313: NO), the processing returns to S309 and whether it is necessary to give advance notice of the acceleration control or not is judged.

The timing when to give the notice is, for example, when neither the accelerator operation nor the brake operation is performed for five seconds or longer after the cancellation of control. Informing the passenger in this manner prevents the passenger from mistakenly recognizing continuation of the autonomous control of the vehicle and thereby failing to perform the driving operation. Particularly, the acceleration caused by the downhill grade is dangerous, so that it is desirable that a stronger alert for attention should be made. Furthermore, when the peripheral status recognition unit 105 can recognize, for example, vehicles ahead and the distance between the passenger's vehicle and the preceding vehicle reduces, an alert for attention is made to inform the passenger that their vehicle is approaching to the preceding vehicle, and the passenger is informed and prompted to perform the driving operation.

[Notice Control Processing for Lane-Keeping Assist]

Figure 4:
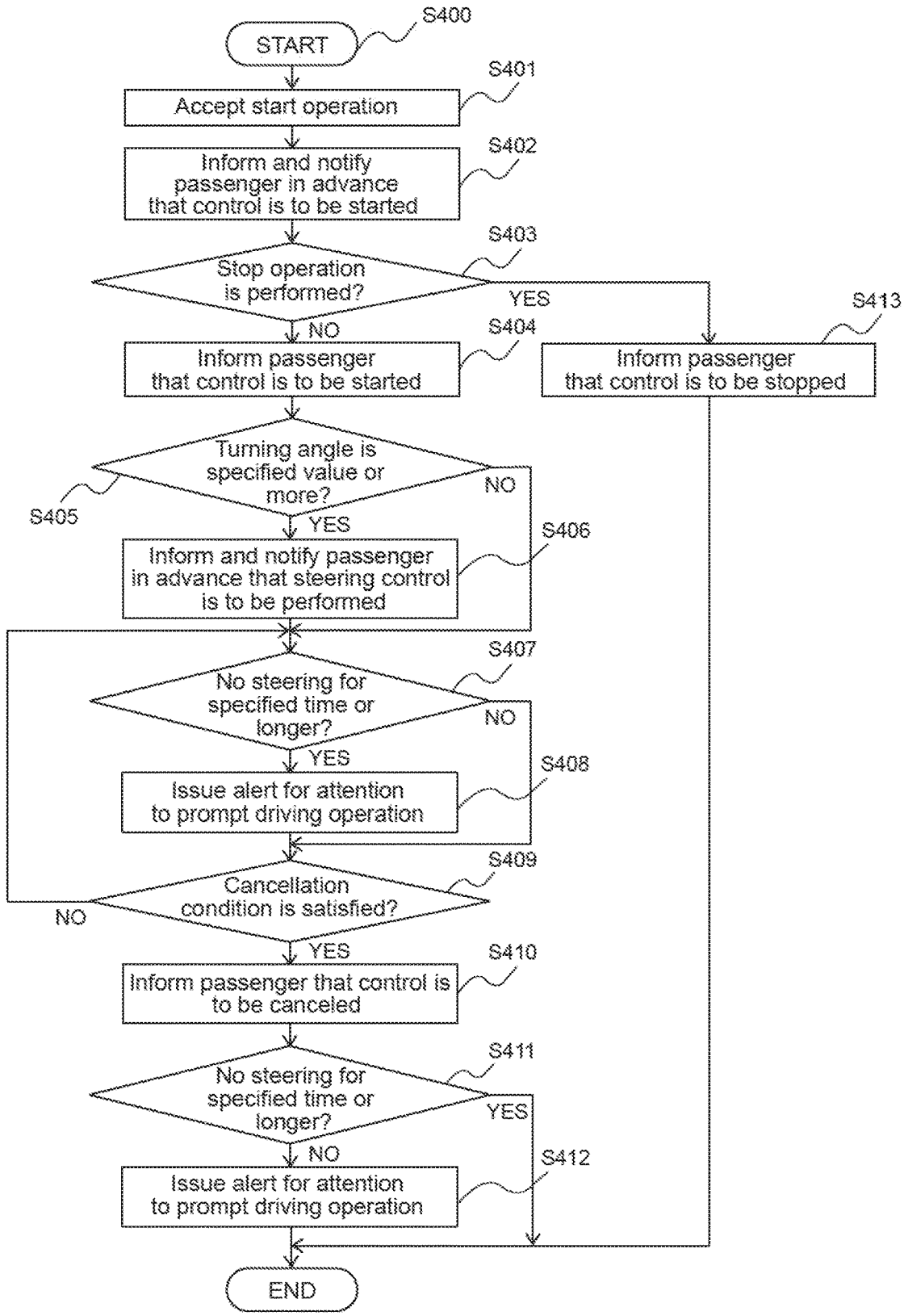
FIG. 4 is an example of a flowchart for explaining the notice control processing for lane-keeping assist.

FIG. 4 illustrates a flowchart for explaining the notice control processing associated with lane-keeping assist performed by the autonomous driving control apparatus 100. The lane-keeping assist is a function assisting steering along a lane of a road and is autonomous control limited to steering control. The steering control is performed on the premise that the passenger proactively performs steering; and the control is performed within the range of correcting the passenger's steering. The lane-keeping assist is started by the passenger's start operation. Regarding the lane-keeping assist, the passenger is informed that the steering control is to be performed.

When the autonomous control setting input unit 103 issues an instruction to start the lane-keeping assist (S401), the passenger is notified that the lane-keeping assist is to be started within a specified time. At the same time, the passenger is also informed, as the control content of the lane-keeping assist, that only the steering control is to be performed, the control is intended merely for assistance, and the passenger needs to perform the driving operation by themselves (S402).

Accordingly, when the passenger has mistakenly started the lane-keeping assist or when the passenger intended to select another autonomous control, but has mistakenly selected the lane-keeping assist, the passenger can notice their mistake immediately and start the stop operation. When the stop operation is not performed within a specified time (S403: NO), the passenger is informed that the lane-keeping assist is to be started (S404), and then the lane-keeping assist is started.

When an angle formed by the center line of the vehicle and the lane (turning angle) is large at the time of the start and it is judged that steering of a specified size or more is required in order to make the center line of the vehicle return to a position in parallel with the lane (S405: YES), the passenger is informed of the direction of steering (S406). On the other hand, when driving is performed almost along the lane in the manual driving mode and it is mostly unnecessary to modify the direction of the vehicle (S405: NO), the passenger is not informed of the direction of steering.

When a steering assist amount is large, there is a possibility that the passenger may feel discomfort. So, the effect of dissolving this discomfort feeling can be expected by notifying the passenger in advance. Incidentally, when it is judged that the steering of the specified size or more is required even after the starting point, the passenger may be informed of the direction of steering.

Furthermore, when the steering by the passenger is not performed for a specified time or longer (S407: YES), the passenger is notified and prompted to perform the steering (S408). Under this circumstance, the passenger is informed again that the lane-keeping assist is driving assistance. The timing when to give the notice is, for example, when steering is not performed for five seconds or longer. When the peripheral status recognition unit 105 can no longer recognize any vehicles ahead, etc. due to the weather or any other reasons or the passenger performs the cancellation operation and the cancellation condition is thereby satisfied and the lane-keeping assist is to be terminated (S409: YES), the passenger is informed that the control is to be terminated, and the passenger is prompted to perform steering (S410). Under this circumstance, when the passenger has not performed steering for a specified time or longer (S407: YES), the passenger is notified of the termination of the steering assist and is notified and prompted again to perform steering (S412). On the other hand, when the cancellation condition is not satisfied (S409: not satisfied), the processing returns to S407 and whether it is necessary to give advance notice of the acceleration or deceleration control or not is judged.

Incidentally, the lane-keeping assist and the adaptive cruise control can be used at the same time. The simultaneous use of the lane-keeping assist and the adaptive cruise control is the autonomous control to perform the speed control and the steering control in cooperation with each other. The steering control is the control within the range of correcting the steering by the passenger as described above, so that the steering by the passenger is required.

When the lane-keeping assist and the adaptive cruise control are used at the same time, the notices upon the start of the respective cases are combined. Specifically speaking, the passenger is informed, as the control content, that: the speed of the vehicle will be controlled to maintain the set speed and will be decelerated to maintain the set distance between the passenger's vehicle and the preceding vehicle when their vehicle comes closer to the preceding vehicle; and the steering control is performed, but the control is intended merely for assistance and the passenger needs to perform the operation by themselves.

Then, just like the adaptive cruise control, the passenger is informed of whether the vehicle will be accelerated or decelerated immediately after starting the control. Furthermore, just like the lane-keeping assist, when the turning angle formed by the center line of the vehicle and the lane is a specified angle or more at the time of the start and it is judged that steering of a specified size or more is required in order to make the center line of the vehicle return to the position in parallel with the lane, the passenger is informed of the direction of steering. Furthermore, since the control content of this control is close to that of the autonomous driving, the passenger is informed in an emphasized manner that it is not the autonomous driving. Informing the passenger in this manner can prevent the occurrence of the state where the passenger mistakenly recognizes that the autonomous driving has been started, and the passenger thereby performs no driving operation at all.

[Notice Control Processing upon Start of Autonomous Driving]

Figure 5:
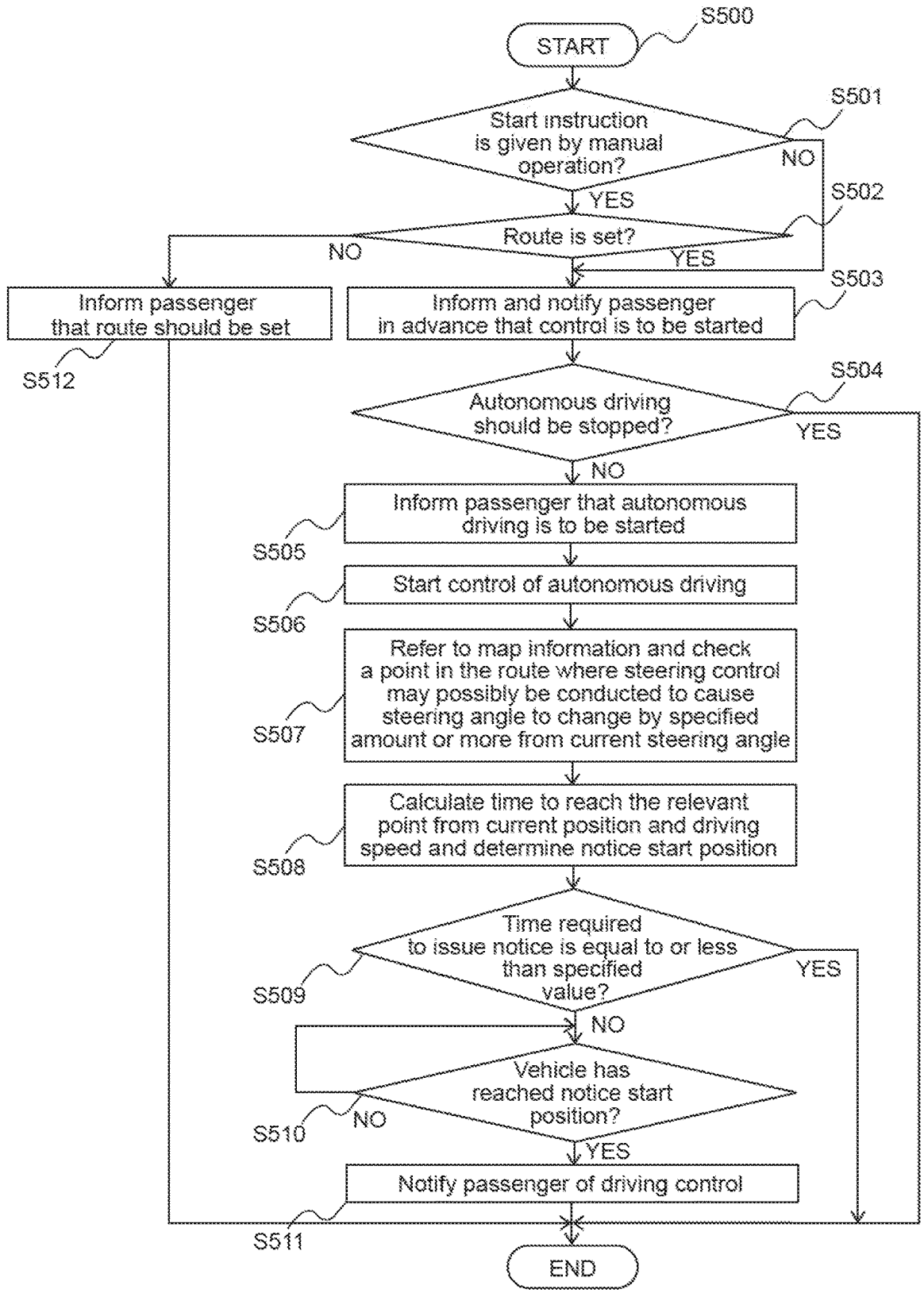
FIG. 5 is an example of a flowchart for explaining the notice control processing when staring autonomous driving.

FIG. 5 illustrates a flowchart for explaining the notice control processing associated with the autonomous driving performed by the autonomous driving control apparatus 100. While steering is positioned as assistance with respect to the lane-keeping assist, the autonomous driving completely controls both the speed and the steering and the passenger does not basically perform the driving operation except for emergencies. Incidentally, this embodiment is designed on the premise that the passenger is seated on a driver's seat and is in a state capable of performing the driving operation at any time.

Furthermore, the steering wheel is configured so that the steering angle changes in accordance with a steered angle of the vehicle in the same manner as the case where the passenger performs the driving operation. In a case of a steer-by-wire system in which a steering wheel is mechanically separated from steered wheels, it is possible to not move the steering wheel during the autonomous driving in terms of the structure. However, if the steering angle is different from the steered angle and when it becomes necessary to switch to the manual driving mode, the necessity to make the steering angle coincide with the steered angle arises and it takes time to implement switching. Furthermore, if the steering wheel is turned at a high speed in order to reduce the switching time, there is a possibility of posing a risk to the passenger. Because of this reason, it is desirable that the steered angle coincides with the steering angle.

Regarding the autonomous driving, the control is started autonomously when the passenger performs the start operation or when arrival at a certain location is detected. In the case where the autonomous driving is started as the vehicle has arrived at the certain location, for example, the configuration is designed so that when the autonomous driving is operable, but is only limited to an expressway or an exclusive road according to specifications of the vehicle, the autonomous driving is started autonomously at a point where the vehicle enters the relevant road. In this case, the passenger sets a route including the relevant road in advance and then the passenger drives the vehicle until it reaches that road. Then, at a point where the self-position estimation unit 106 detects that the vehicle has entered that road, the autonomous driving is started.

Firstly, the processing is classified depending on whether the instruction to start the autonomous driving is an instruction from the autonomous control setting input unit 103 or an instruction given as a result of recognition of a specified location such as an expressway by the self-position estimation unit 106. When the instruction is from the autonomous control setting input unit 103, that is, the passenger has performed the start operation on the scene (S501: YES), the autonomous driving control unit 101 checks if the route setting for the autonomous driving is set or not (S502). If the route is not set (S502: NO), the autonomous driving cannot be started and, therefore, the passenger is informed that the route should be set, and the processing is terminated (S512). Furthermore, when the route setting has not changed from the last time the vehicle ran, notice may be given to check whether the route setting is correct or not.

When the route is set by the passenger's start instruction (S502: YES) or when the start instruction is given by the judgment of the self-position estimation unit 106, the passenger is notified in advance that the autonomous driving is to be started (S503). The passenger is notified that the autonomous driving will be started within a specified time; and under this circumstance, the passenger is informed, as the control content, that the steering control and the speed control will be performed in accordance with the set route and the passenger does not have to perform the driving operation. Incidentally, when the autonomous driving can no longer be continued for whatever reason, the passenger is also notified that there is a possibility of switching to the manual driving. Moreover, regarding the route which is set at that point in time, the passenger may be informed of the destination, the outline of the route, an amount of time required, and so on.

Accordingly, when the passenger has mistakenly started the autonomous driving or when the passenger intended to select another autonomous control, but has mistakenly selected the autonomous driving, or when the route setting is wrong, the passenger can notice their mistake immediately and start the stop operation.

When the autonomous control setting input unit receives an instruction to suspend switching to the autonomous driving within a specified time (S504: YES), the autonomous driving control unit stops switching to the autonomous driving. In this case, the manual driving mode continues without stopping and the passenger continues to perform the driving operation by themselves.

Under this circumstance, for example, when a self-position estimation method of the self-position estimation unit 106 is only GPS and if the vehicle runs on a general road which runs parallel to the relevant road and the autonomous driving is started by assuming an expressway or the like, the vehicle will result in running at a speed equal to or higher than a speed limit on the general road, which is dangerous. In order to prevent this, before starting the autonomous driving in the case of NO in S501, the autonomous driving may be started by the passenger performing specified operation to approve the start in response to the advance notice to start the autonomous driving control in S503. In this case, when the approval operation is not performed within time, switching to the autonomous driving is stopped. When such procedure is employed, an operation step to approve the start is required after the start operation; however, this has the advantage of being capable of switching to the autonomous driving whenever the passenger chooses as compared to the case where while the passenger's intention is being checked, the autonomous control setting input unit 103 waits for the aforementioned specified time to pass. The approval operation may be performed by means of, for example, pressing a start button again or pressing a button on a touch panel; and in any of these cases, it should be ensured that the passenger's intention is checked by, for example, announcing the content of the operation at the time of the start operation.

Furthermore, when the self-position estimation method by the self-position estimation unit 106 operates simultaneously with an in-vehicle device of ETC (registered trademark) or when a camera is installed in the vehicle and image recognition can make it possible to recognize that the vehicle has passed through a specified position such as an expressway, the procedure as illustrated in the flowchart of FIG. 5 may be operated; and in other cases, the approval operation by the passenger may be required as described above.

When the instruction to stop switching to the autonomous driving is not received within the specified time (S504: NO), the passenger is notified that the autonomous driving by the autonomous driving control unit 101 is to be started (S505). This notice may also explain actions to take when the passenger performs the driving operation against the autonomous driving control by the autonomous driving control unit 101. By previously explaining the actions to take when the driving operation is performed during the autonomous driving, the passenger can act appropriately even if they mistakenly operate; and it is also possible to enhance the passenger's consciousness to not perform the driving operation.

Regarding control of the passenger's driving operation during the autonomous driving, possible options include: prioritizing the autonomous driving control; prioritizing the passenger's driving operation and canceling the autonomous driving; and temporarily canceling the autonomous driving. Particularly, when the configuration to prioritize the passenger's driving operation and cancel the autonomous driving is employed, there is a possibility that the passenger may become confused by sudden termination of control caused by the cancellation of the autonomous driving. On the other hand, by informing the passenger of the details of switching to the autonomous driving immediately before switching so that the passenger can confirm it, safe switching to the manual driving mode can be realized.

When the autonomous driving is started by taking the above-described step, the passenger is informed again that both the speed and the steering will be controlled (S506). Furthermore, just like the adaptive cruise control, the passenger is informed of whether the vehicle will be accelerated or decelerated immediately after starting the control. The reason why the control is to be performed, for example, whether a preceding vehicle exists or not, may be explained in detail. For example, the passenger is informed that: the set speed is 80 km/h; however, since there is a preceding vehicle, the passenger's vehicle is running at 70 km/h along with the preceding vehicle. Particularly, when the preceding vehicle no longer exists and the acceleration control is to be performed to accelerate to the set speed, the passenger is notified that the speed is to be accelerated to the set speed of 80 km/h.

When the speed control is performed autonomously and acceleration continues in a state where a target speed is unknown, there is a possibility that the passenger may feel anxious. So, the passenger is informed whether a current driving speed is the set speed or not, or whether the vehicle is running at a speed lower than the set speed due to, for example, the existence of a preceding vehicle or not; and when acceleration is to be performed, the passenger is notified and informed of specifically to what km/h the speed will be accelerated. By giving such notice, the passenger's anxiety about the autonomous control can be reduced; and even if unexpected acceleration should be performed due to an abnormal operation of the autonomous driving control apparatus 100, the passenger can notice it and deal with it appropriately by practicing, for example, an emergency stop.

Furthermore, when the autonomous driving is started while the vehicle is running on a curve, a steering angle of the steering as steered by the passenger is maintained as it is although it depends on the circumstances. However, there is a possibility that after turning the steering wheel to run on the curve, the passenger may hesitate to remove their hands from the steering wheel and then keep steering. If the configuration is designed to cancel the autonomous driving when the driving operation by the passenger is detected, there is a possibility that the autonomous driving may be canceled under the above-described circumstance; however, it depends on specifications of the judgment on switching to the autonomous driving.

In order to prevent the above situation, when the autonomous driving is started while the vehicle is running on a curve, the autonomous driving control unit 101 informs the passenger that steering will be autonomously controlled by the autonomous driving and the steering angle will be maintained even if the passenger removes their hands from the steering wheel. Informing the passenger in this manner can prevent the passenger from unnecessarily imposing force on the steering wheel and disturbing the autonomous driving control.

Furthermore, when steering according to the lane is performed for the first time after starting the autonomous driving, the autonomous driving control unit 101 notifies the passenger, via the information notification unit 104, that steering will be controlled by the autonomous driving. Regarding lane-keeping control when running straight, there is no significant change in the steering angle, so that the possibility that the passenger may operate the steering wheel in that condition is low.

However, when entering a curve, the vehicle would go off the road unless the passenger performs steering in the manual driving mode. So, there is a possibility that the passenger may instantaneously operate the steering wheel. If the specifications are designed so that the autonomous driving is canceled by the passenger's driving operation, there is a possibility that the autonomous driving may be canceled in the middle of the curve, thereby causing an unstable condition. Therefore, the occurrence of such condition is prevented by notifying the passenger in advance that the steering control is to be performed.

In order to give this notice, the autonomous driving control unit 101 firstly searches for a point ahead along the traveling road at which it is estimated that the steering control will be performed to cause the steering angle to change as much as a specified amount or more from the current steering angle (S507). Under this circumstance, the steering control to cause the steering angle to change means that the steering angle changes relative to the steering angle in the current state. When the vehicle is running on a straight road, the point at which the steering control to cause the steering angle to change may possibly be performed would be a curve-entering point. When the vehicle is running on a curve, the above-mentioned point would be a point where that curve ends and the vehicle enters a straight road or a next curve. Also, a branch or a right/left turning point would be the above-mentioned point.

Regarding this processing, the self-position estimation unit 106 firstly judges whether a currently running position is on a straight road or a curve. When it is on the straight road, the self-position estimation unit 106 searches for a point with the closest distance from the vehicle from among a point entering a next curve, a branch point, and a left/right turning point along the set route and calculates time required to reach the relevant point. When the vehicle is running on the curve, the self-position estimation unit 106 searches for a point with the closest distance from the vehicle from among an ending point of the curve where the vehicle is currently running, a branch point, and a left/right turning point and calculates time required to reach the relevant point. In order to estimate arrival time, the distance from the current point to the relevant point and a current driving speed are used.

Since notice has to be completed before the vehicle reaches the relevant point, it is necessary for the notice to be given before the arrival time at the relevant point and for the passenger to understand the content of that notice. Therefore, the autonomous driving control unit 101: calculates the distance by assuming that the vehicle runs at the current speed as long as time required to give the notice plus at least several seconds; and then sets a point returning as far back as this distance from the relevant point as a notice starting point (S508). The time required to give the notice is, in a case of voice notice, the length of that voice. Also, in a case of a message display on a display, the time required to give the notice is time to read the message. The time to read the message is calculated according to the number of characters by estimating, for example, 0.1 seconds per word.

Then, when the vehicle reaches the relevant point (S510: YES), the autonomous driving control unit 101 notifies the passenger to that effect via the information notification unit 104 (S511). This notice includes the content to be controlled. As an example, in a case of entering a right curve, the autonomous driving control unit 101 notifies the passenger that the right curve is approaching and the steering will be turned right. By notifying the passenger of the control content, it is possible to enhance the passenger's consciousness to realize more strongly that the autonomous driving is being performed.

Regarding turning of the steering, an animation display may be used to show how the steering will be turned, thereby indicating how much the steering will be actually turned. Furthermore, when the driving operation is performed under this circumstance, the passenger may be informed again of operation such as cancellation of the autonomous driving when the passenger performs the driving operation. However, when the distance between the autonomous driving starting point and the relevant point is short and time when the notice can be given is limited (S509: YES), the control is performed to omit the notice.

The notice to report that the curve is approaching is generally given by means of car navigation, but a part that issues an alert for attention with respect to the performance of the autonomous control is different. This notice control processing can prevent the passenger from mistakenly performing the driving operation immediately after the start of the autonomous driving. Accordingly, it is possible to prevent the unstable state such as cancellation of the autonomous driving from happening accidentally and make the transition to the autonomous driving safely.

Furthermore, when the steering wheel turns in accordance with the autonomous control, it will turn substantially in a short time when the vehicle turns right or left at an intersection. So, this operation of the steering wheel may become dangerous to the passenger. For example, when the steering wheel turns substantially in a state where the passenger's hands are placed on the steering wheel, there is a possibility that the passenger's hands may be tangled in the rotation and get hurt.

So, when it is expected that the steering angle of the steering wheel will change for a specified amount or more, the passenger is notified in advance and an alert for attention is made to inform the passenger that the steering wheel will turn. Whether the notice should be given or not is judged on the basis of the steering angle and the angular velocity of the steering wheel. For example, even if the steering angle changes substantially as the vehicle enters a sharp curve, if the speed of the vehicle is slow due to a traffic jam, the angular velocity of the steering wheel reduces and, therefore, the notice is not given.

So, for example, the notice will be given only when there is a possibility that the steering wheel may turn with the steering angle of 45 degrees or more and at the angular velocity 90 degrees/second or less. The notice judgement does not necessarily follow this condition; however, the notice will not be given when the steering wheel moves slightly while running straight, the speed of the vehicle is slow, and the steering wheel turns so slowly that it takes several tens of seconds for the steering angle to change by 90 degrees.

[Notice Control Processing for Overtaking Control during Autonomous Driving]

Figure 6:
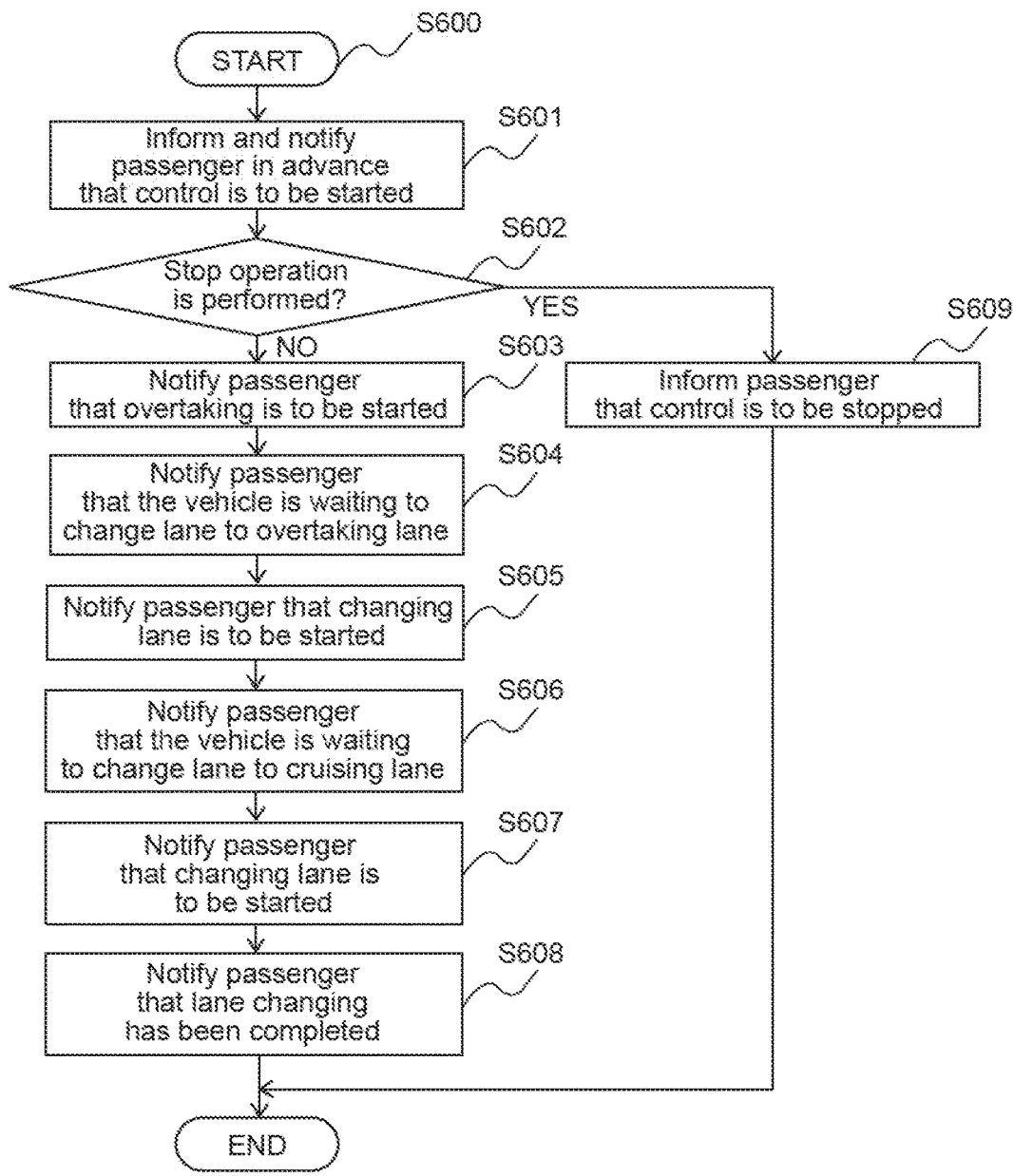
FIG. 6 is an example of a flowchart for explaining the notice control processing for overtaking control during the autonomous driving.

Next, overtaking during the autonomous driving will be explained. FIG. 6 illustrates a flowchart for explaining the notice control processing associated with overtaking performed during the autonomous driving. Regarding the adaptive cruise control, when the vehicle reaches a preceding vehicle, the control is performed to only decelerate in accordance with the speed of the preceding vehicle. However, the autonomous driving has a function performing the autonomous control to overtake the preceding vehicle. Incidentally, it may be designed that when the vehicle reaches the preceding vehicle, whether to just follow the preceding vehicle or overtake it can be set in advance. Furthermore, even if the setting is made to run and follow the preceding vehicle, it may be designed that the vehicle can overtake the preceding vehicle by means of the passenger's operation during the autonomous driving.

When overtaking by the autonomous control is to be executed, advance notice of overtaking is given when the distance between the passenger's vehicle and the preceding vehicle becomes a specified value or less (S601). The notice informs the passenger that after autonomously changing the lane to an overtaking lane, the passenger's vehicle will return to a cruising lane again when it comes ahead of the vehicle running on the cruising lane.

Under this circumstance, it is designed in the same manner as when starting each autonomous control mode that the lane change is not started immediately after the advance notice, so that the stop operation can be accepted. Then, when the stop operation is not performed within a specified time (S602: NO), overtaking is started. Incidentally, since it would be dangerous if the autonomous driving is canceled by the passenger's driving operation during the overtaking, the passenger is notified via sounds or display that the overtaking is being executed, while executing the overtaking (S603). For example, processing for emitting a certain sound at regular intervals or displaying an indication that overtaking is being performed is executed until the completion of overtaking.

The overtaking control is designed to give notice to inform the passenger of any of the following states the vehicle is in: the vehicle is waiting to change the lane to the overtaking lane; the vehicle is changing to the overtaking lane; the vehicle is running on the overtaking lane after changing the lane (or waiting to change the lane to the cruising lane); and the vehicle is changing the lane to the cruising lane. The first step of overtaking is to wait to change the lane to the overtaking lane (S604). When the peripheral status recognition unit 105 judges that there is no other vehicle on the overtaking lane and the vehicle can change the lane, the processing proceeds to the next step and the passenger is notified that changing to the overtaking lane is to be started (S605). Incidentally, when a vehicle running behind the passenger's vehicle on the lane to which the passenger's vehicle is changing approaches while changing the lane and if there is fear of collision, the passenger is informed that the vehicle running behind the passenger's vehicle is approaching and the lane change is to be stopped temporarily.

When the lane change cannot be executed due to a large traffic volume on the overtaking lane while waiting to change the lane, the passenger is notified to that effect and whether to stop the overtaking operation or not is confirmed. The basis for giving this confirmation notice is when time required for the autonomous driving control unit 101 to judge that the vehicle is in a state being incapable of changing the lane due to, for example, a short distance between the passenger's vehicle and a vehicle which is running on the overtaking lane and is detected by the peripheral status recognition unit 105, continues for a specified time or longer. The specified time is, for example, about one minute. The passenger may set this time arbitrarily.

When whether the autonomous lane changing can be executed on a severer safety basis than as performed by the passenger is judged, the autonomous driving control unit 101 may possibly judge that the autonomous lane changing cannot be executed even in a situation where the passenger' driving operation could make the vehicle change the lane sufficiently. So, it may be designed so that under such situation, the passenger is informed to that effect, the autonomous driving is temporarily canceled, and the lane change can be performed by the passenger's operation.

For example, whether the lane change can be executed or not is judged according to whether the distance between vehicles running on the overtaking lane is a specified distance or more and a relative speed between a vehicle running on the overtaking lane and the passenger's vehicle is a specified speed or less; success probability ranging from 0% to 100% is calculated; and if the success probability is less than 100%, it is judged that the lane change cannot be executed. Under this circumstance, if this success probability is 90% or more, the passenger is notified that if the passenger performs a specified operation, it is possible to temporarily switch to the manual driving mode and change the lane by the passenger's driving operation.

When the lane change is completed, the vehicle runs on the overtaking lane (S606). In this step, it is in a state where the peripheral status recognition unit 105 recognizes the state of vehicles running on the cruising lane and looks for the timing to change to the cruising lane. The passenger is notified in the same manner as when starting overtaking that the vehicle is looking for the timing to change the lane. Then, when it is judged that the lane change can be executed, the passenger is notified that the lane change to the cruising lane is to be started (S607).

Also in this step, when a vehicle running behind the passenger's vehicle on the lane to which the passenger's vehicle is changing approaches while changing the lane and if there is fear of collision, the passenger is informed that the vehicle running behind the passenger's vehicle is approaching and the lane change is to be stopped temporarily. Furthermore, it is designed that: notice is made to inform the passenger of the abovementioned judgment result of whether the aforementioned lane change can be executed or not; and the lane change can be also executed by the passenger's operation. Once the lane change to the cruising lane is completed, the passenger is notified that the overtaking has been completed (S608).

By informing the passenger in each step of control as described above, it is possible to make the passenger understand the control content and prevent accidental cancellation of the control. Incidentally, if the passenger is informed in detail every time the overtaking is performed, there is a possibility that the passenger may feel annoyed. So, the process may be simplified so that, for example, after starting the autonomous driving, the passenger may be informed of all pieces of information only for the first overtaking operation and some pieces of information may be omitted for the second and subsequent operations. For example, the passenger may be informed of all the steps by using sounds for only the first overtaking operation and the passenger may be informed only by displaying the notices for the second and subsequent operations. However, even if the passenger is informed in this manner, when the situation which is different from the normal situation arises, for example, when a vehicle running behind the passenger's vehicle on the lane to which the passenger's vehicle is changing approaches and the lane change is temporarily stopped, it is ensured that the passenger is notified of the above information by indicating the information via sounds or the like.

The notice control for overtaking has been explained above; however, when only changing the lane, the same notice control as that for the lane change steps upon overtaking is performed. Specifically speaking, as the lane change control is started, the passenger is notified that the vehicle is waiting for the timing to change the lane; and when it is judged that the lane change is possible, the passenger is notified that the lane change to the cruising lane is to be started. Furthermore, when a vehicle running behind the passenger's vehicle on the lane to which the passenger's vehicle is changing approaches while changing the lane and if there is fear of collision, the passenger is informed that the vehicle running behind the passenger's vehicle is approaching and the lane change is to be stopped temporarily.

On the other hand, since there are various reasons for changing the lane unlike the overtaking, the passenger is informed in advance of why the lane change is to be performed. Cases where the lane change is to be performed include: in a case of a general road, when turning right or left, when avoiding vehicles turning right or left on a road with two lanes in each direction, when avoiding vehicles parked on the road; and in a case of an expressway, when changing the lane before a branch according to a destination, when the number of lanes decreases, and so on. For example, the passenger is informed that changing to a lane for turning right is to be performed in order to turn right at the next intersection.

If the passenger is not notified of the reason for the lane change, for example, when the lane change is performed in order to avoid vehicles parked on the road, the passenger may possibly stop the autonomous control by mistakenly interpreting that the autonomous control is intended to turn at the next intersection while the passenger intends to run straight. On the other hand, notifying the passenger of the reason for the lane change has the effect of allowing the passenger to confirm that the vehicle is being driven autonomously towards the destination intended by the passenger.

[Notice Control Processing when Turning Right or Left at Intersection during Autonomous Driving]

Figure 7:
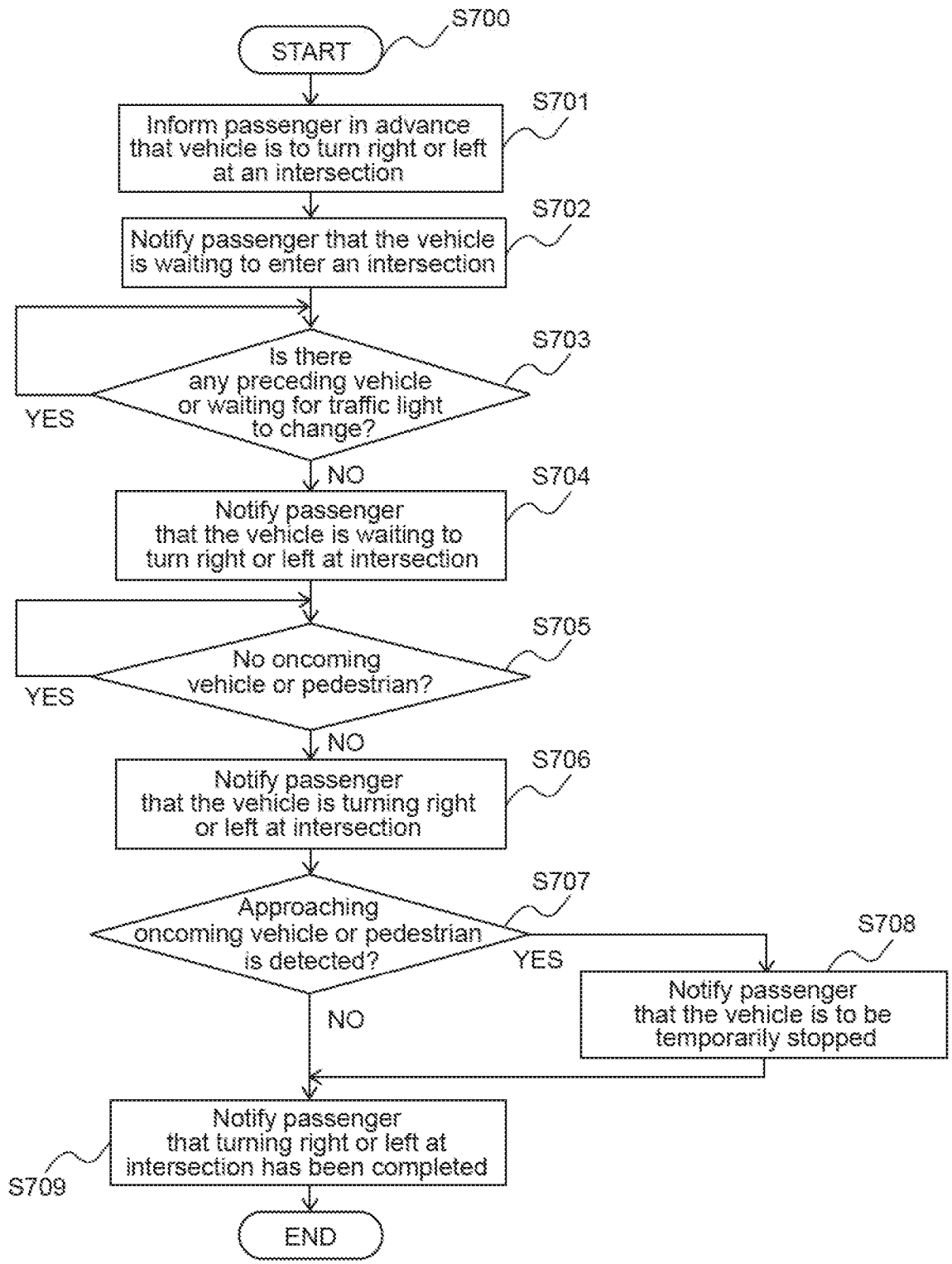
FIG. 7 is an example of a flowchart for explaining the notice control processing when turning right or left at an intersection during the autonomous driving.

Next, notice control associated with turning right or left at an intersection during the autonomous driving will be explained. FIG. 7 illustrates a flowchart for explaining the notice control processing associated with turning right or left at an intersection during the autonomous driving. The vehicle is made to autonomously turn right or left at an intersection during the autonomous driving according to a preset route. When turning right or left, the passenger is notified that turning right or left is to be performed, when the vehicle comes close to the relevant intersection (S701). Regarding the timing to give notice, the notice may be given a plurality of times, in the same manner as general car navigation, as the vehicle approaches the intersection.

The difference between the notice given when turning right or left at an intersection during the autonomous driving and notice given by car navigation is as follows: while the notice for the car navigation is given to prompt the driving operation by telling the passenger to turn right at the next intersection, the notice for the autonomous driving is given that the autonomous control is to be made to turn right or left. Furthermore, since the steering wheel turns substantially when the vehicle turns right or left, the passenger is notified to that effect in order to make an alert for attention so that the passenger will not get hurt by touching the turning steering wheel.

The control to turn right or left is divided into some steps in the same manner as the aforementioned overtaking control and the passenger is notified so that the passenger will be able to know which step is being executed. The first step is a state of waiting to enter an intersection (S702). This is the state where the vehicle approaches the intersection until it enters the intersection, that is, where the notice of turning right or left is started until the vehicle enters the intersection.

After entering the intersection, the vehicle enters a state of waiting to turn right or left and judging whether turning right or left is possible by checking oncoming vehicles and pedestrians (S704). Incidentally, this step is executed under the condition that not only the position of the vehicle is located within the intersection, but also no vehicle waiting to turn right or left exists in front of the passenger's vehicle (S703: YES). When any preceding vehicle exists even if the passenger's vehicle has entered the intersection, the passenger's vehicle is in the state of waiting to enter the intersection (S703: YES). If it is judged from the recognition result of the oncoming vehicles and the pedestrians that turning right or left is possible (S705: NO), the processing proceeds to a step of turning right or left and the passenger is notified that the vehicle is turning right or left (S706). In this step, the vehicle is in a state of running within the intersection. If any oncoming vehicle or pedestrian then approaches and the vehicle needs to temporarily stop while running within the intersection (S707: YES), the passenger is notified to that effect (S708). When the vehicle enters a road after turning right or left and enters a state of running straight, this step is completed and the passenger is notified that the process of turning right or left at the intersection has been completed (S709).

Incidentally, if there is no oncoming vehicle or pedestrian, time required for this series of actions is short. So, the passenger is not informed in detail by giving voice notices for all the steps, but the passenger is informed in detail only in a case of emergency such as a case where the control is stopped because an oncoming vehicle has approached to the passenger's vehicle. In that case, the passenger is informed of for what reason the control is stopped. For example, the reason for the suspension of control includes: there is a possibility of a collision with the oncoming vehicle; and a pedestrian has entered a crosswalk.

By informing the passenger in this manner, the passenger can recognize obstacles and confirm that the control based on the recognition result is performed properly, so that it is possible to make the passenger feel safe with the autonomous driving control. On the other hand, there is also the effect of preventing the passenger from overestimating the autonomous driving control. Even if the autonomous driving control unit 101 could not have recognized the obstacles sufficiently, the passenger could not judge the obstacles or avoid the danger unless the passenger is notified of the obstacle recognition result or the control based on such obstacle recognition result. The notice allows the passenger to determine whether the autonomous driving control is operating properly; and if the passenger determines that it is dangerous, they can stop the control and switch to the manual driving mode.

Furthermore, when the vehicle is waiting at a traffic light, not necessarily when turning right or left, or when the vehicle is stopped due to a traffic jam or the like, the passenger is notified that the brake is controlled autonomously. There is a possibility that while the vehicle is stopped, the passenger may mistakenly perform the brake operation, which may influence the autonomous driving control or cause forced cancellation of the autonomous driving. So, this is prevented by the notice. Particularly, when the vehicle is stopped for the first time after starting the autonomous driving, the passenger is notified that the brake control is being performed.

Next, the notice control associated with emergency stop during the autonomous driving will be explained. The emergency stop is performed during the autonomous driving, for example, when the emergency stop is required to avoid collisions with any surrounding obstacles and when the passenger's vehicle is stopped as an emergency vehicle approaches. When the vehicle is stopped in order to avoid collisions, sudden braking is applied in many cases, so that the passenger is notified to that effect. The passenger is notified before applying the sudden braking when possible; however, in unavoidable circumstances, the passenger is notified at the same time as the sudden braking. Furthermore, the notice should explain for what reason the sudden braking is performed.

Incidentally, the first purpose of the notice is to make the passenger gird for an impact caused by the sudden braking, so that the notice is given by prioritizing application of the sudden braking. There will be no problem if the passenger is notified of the reason for the sudden braking after the vehicle is stopped.

When the passenger's vehicle is stopped as the emergency vehicle approaches, the passenger is firstly notified that the emergency vehicle is approaching when the autonomous driving control unit 101 directly obtains information about the approach of the emergency vehicle by means of vehicle-to-vehicle communications. Incidentally, the approach of the emergency vehicle may be judged by, for example, recognizing the sound of sirens or judging from videos of surrounding cameras. After the passenger is notified that the emergency vehicle is approaching, the passenger is then notified of the emergency stop for the approach; and the passenger is notified that the control to make the emergency stop is to be started.

The control to make the emergency stop is to stop the vehicle immediately or to stop the vehicle after moving to a road shoulder. For example, when the vehicle is running on a lane close to the road shoulder, it is appropriate to move to the road shoulder and then stop the vehicle. In that case, the passenger is informed that the vehicle is moving to the road shoulder and will stay stopped until the emergency vehicle will pass. There is a possibility that the autonomous driving control unit 101 may not be able to judge whether the emergency vehicle has passed or not, and the state of the emergency stop may continue. So, it may be designed so that the passenger can cancel the emergency stop by performing specified operation. If such configuration is employed, the passenger will be informed of a cancellation method and will be notified that the passenger should be responsible for performing the operation.

[Notice Control Processing upon Cancellation of Autonomous Driving]

Figure 8:
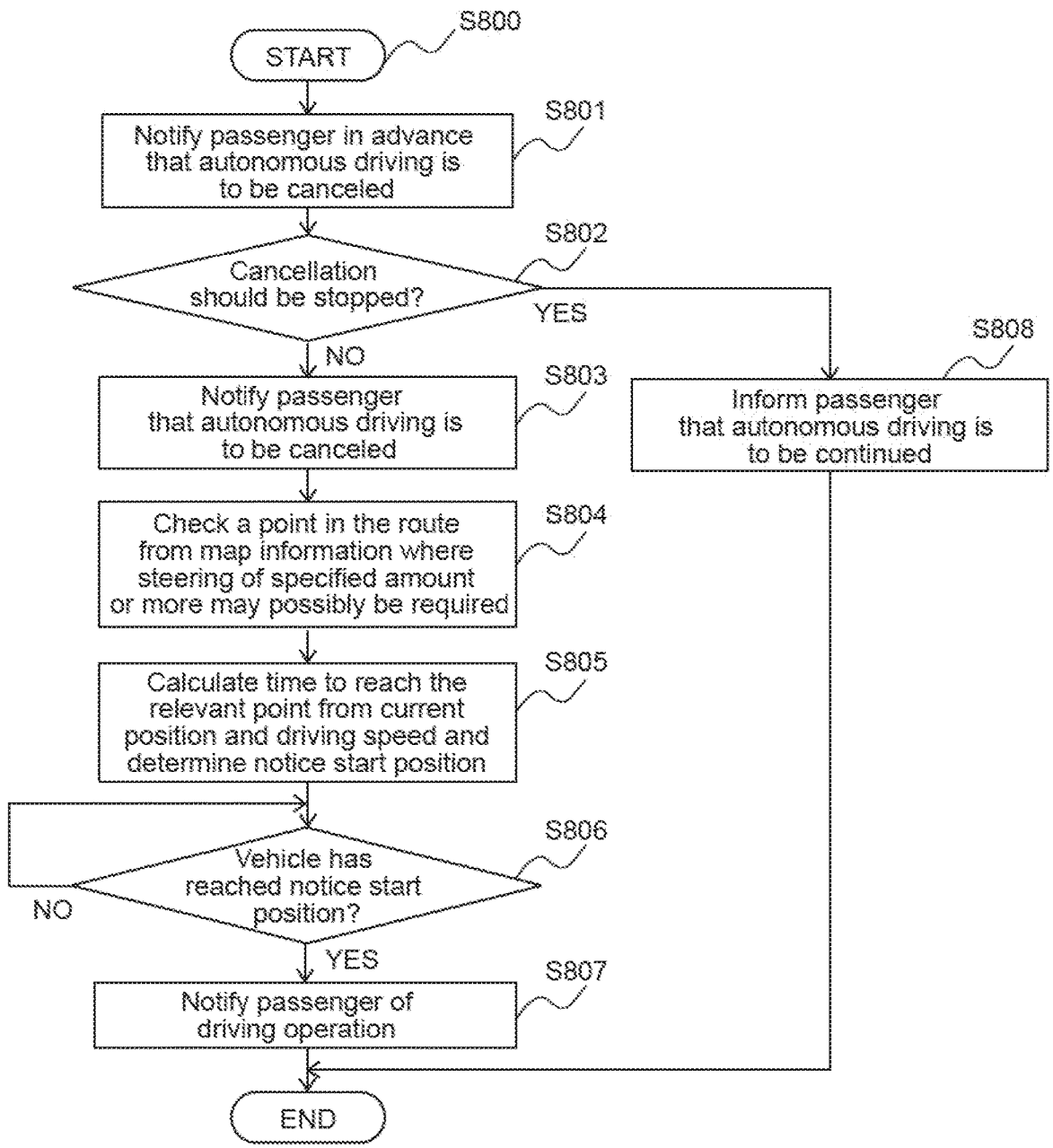
FIG. 8 is an example of a flowchart for explaining the notice control processing when canceling the autonomous driving.

Next, an explanation will be given about the notice control processing associated with the cancellation of the autonomous driving. FIG. 8 illustrates a flowchart for explaining the notice control processing associated with the cancellation of the autonomous driving. The cancellation of the autonomous driving happens not only when the passenger performs cancellation operation by themselves, but also when the passenger performs the driving operation during the autonomous driving or when the autonomous driving control unit 101 cannot continue the autonomous driving. Examples of the situation where the autonomous driving control unit 101 cannot continue the autonomous driving include when the peripheral status recognition unit 105 cannot function sufficiently due to the weather such as fog, when the peripheral status recognition unit 105 cannot recognize lanes or road edges due to a bad road surface condition, and when the vehicle enters a place, such as a narrow street road, which is registered in advance as an area that is not targeted for the autonomous driving.

Firstly, an explanation will be given about the notice control when the passenger performs the cancellation operation by themselves. When the passenger performs the cancellation operation, the passenger is notified to check again if they really want to cancel it or not (S801), the autonomous control setting input unit 103 waits for a specified time period for the passenger to input confirmation. This prevents the passenger from mistakenly canceling the autonomous driving. When the autonomous control setting input unit 103 does not receive the input to confirm the cancellation of the autonomous driving within the specified time (S802: YES), the autonomous driving control unit 101 stops the cancellation of the autonomous driving and continues the autonomous driving. When this happens, the passenger is notified that the autonomous driving is to be continued (S808).

When the autonomous control setting input unit 103 receives the input to confirm the cancellation of the autonomous driving (S802: NO), the passenger is notified that the autonomous driving is to be canceled and the passenger will perform the driving operation by themselves (S803). Furthermore, when after the cancellation of the autonomous driving the accelerator or brake operation is not performed and deceleration or acceleration caused by a downhill grade continues, the passenger is notified and prompted again to drive. The timing to give the notice is, for example, when the accelerator operation or the brake operation is not performed for five seconds or longer after the cancellation of the control. Informing the passenger in this manner prevents the passenger from mistakenly recognizing continuance of the autonomous control of the vehicle and thereby failing to perform the driving operation. Particularly, since the acceleration at the downhill grade is dangerous, a higher alert for attention is made. Furthermore, when the peripheral status recognition unit 105 recognizes a preceding vehicle, and if the brake operation is not performed in despite of the reduced distance between the passenger's vehicle and the preceding vehicle, the passenger is informed of an alert for attention that the preceding vehicle is approaching, and the passenger is also informed of an alert for attention and prompted to perform the brake operation.

Furthermore, when steering in accordance with the lane is required for the first time after the cancellation of the autonomous driving, the autonomous driving control unit

101 notifies and prompts the passenger to perform the driving operation. If the vehicle is running straight after the cancellation of the autonomous driving, the passenger can drive the vehicle without doing steering so much. So, if that situation continues, the passenger may possibly enter a state of driving the vehicle in an unfocused manner. As a result, it is possible that the passenger may not be able to quickly determine whether the current driving mode when entering a curve is the autonomous driving or the manual driving, so that steering may be delayed and the vehicle may go off the road.

Therefore, when the curve is approaching, the occurrence of the above-described situation is prevented by notifying the passenger that the curve is approaching and steering is required. In order to make this notice, the autonomous driving control unit 101 firstly searches for a point where the steering control may possibly be performed to cause the steering angle to change for a specified amount or more from the current steering angle along the traveling pathway. For example, the steering control to cause the steering angle to change means a change in the steering angle with respect to the steering angle in the current state. When the vehicle is running straight, the point where the operation to cause a change in the steering angle is a curve-entering point. When the vehicle is running on a curve, the above-described point is a point where the relevant curve ends and the vehicle enters a straight road or the next curve. A branch or turning right or left would also be the above-described point.

The change in the steering angle is described as the specified amount or more because of the following reasons: some slight steering is required even, for example, when keeping the lane, but the passenger may feel annoyed if they are notified of such slight steering; it is assumed that the passenger may become unfocused while driving when they have not performed considerable driving operations for a specified time or longer; and if this notice control processing were terminated by making this notice, the passenger could not be notified when they become unfocused while driving, that is, when they should be notified. Therefore, it is assumed that this notice control processing has few advantages.

When executing this processing, the self-position estimation unit 106 firstly judges whether the current position is on a straight road or on a curve. When it is on the straight road, the self-position estimation unit 106 searches for a point with the closest distance from the vehicle from among a point entering a next curve, a branch point, and a left/right turning point along the set route (S804) and calculates time required to reach the relevant point. When the vehicle is running on the curve, the self-position estimation unit 106 searches for a point with the closest distance from the vehicle from among an ending point of the curve where the vehicle is currently running, a branch point, and a left/right turning point and calculates time required to reach the relevant point. In order to estimate arrival time, the distance from the current point to the relevant point and a current driving speed are used.

Since notice has to be completed before the vehicle reaches the relevant point, it is necessary for the notice to be given before the arrival time at the relevant point and for the passenger to understand the content of that notice. Therefore, the autonomous driving control unit 101: calculates the distance by assuming that the vehicle runs at the current speed as long as time required to give the notice plus at least several seconds; and then sets a point returning as far back as this distance from the relevant point as a notice starting point (S805). The time required to give the notice is, in a case of voice notice, the length of that voice. Also, in a case of a message display on a display, the time required to give the notice is time to read the message. The time to read the message is calculated according to the number of characters by estimating, for example, 0.1 seconds per word.

Then, when the vehicle reaches the relevant point, the autonomous driving control unit 101 notifies the passenger to that effect via the information notification unit 104 (S807). This notice includes the content of necessary driving operation. In a case of entering a right curve, the autonomous driving control unit 101 notifies the passenger that the right curve is approaching and the steering needs to be turned right. By notifying the passenger of the operation content specifically that, for example, they need to turn the steering to the right, it is possible to enhance the passenger's consciousness to realize that the driving operation is required.

The notices have been described above from the viewpoints of whether or not the vehicle is in the state of no driving operations being performed, whether steering in accordance with the lane is performed or not, and whether the passenger does not fail to perform the brake operation in response to the approach of a preceding vehicle. In addition to the above, whether the passenger has not overlooked traffic signs or the like is also checked.

When the vehicle is running on an expressway by means of the autonomous driving and the autonomous driving is canceled at a point exiting at an interchange or when the autonomous driving is canceled at a point entering a road with a lower speed limit, there is a possibility that the passenger may overlook the speed limit and continue to drive without decelerating sufficiently. So, when the autonomous driving control unit 101 acquires information about the speed limit from the map information 108 or from a sign recognized by the peripheral status recognition unit 105 and judges that deceleration is required after the cancellation of the autonomous driving, it informs the passenger of the speed limit and notifies and prompts them to decelerate.

Furthermore, when the passenger does not decelerate the speed and continues driving at the speed in excess of the speed limit even after it is judged that deceleration is required after the cancellation of the autonomous driving and the alert for attention is made, the passenger is informed of the alert for attention again to decelerate the speed. Incidentally, even if the information about the speed limit cannot be obtained, the passenger is notified that they should watch out for the speed limit. The same control is performed when it is required to temporarily stop the vehicle. When the autonomous driving control unit 101 judges, from the map information 108 or the sign recognized by the peripheral status recognition unit 105, that it is necessary to temporarily stop the vehicle somewhere ahead on the route, it notifies the passenger that the temporary stop is required. If the passenger does not decelerate the speed, the autonomous driving control unit 101 informs the passenger again of the alert for attention to prompt them to decelerate the speed.

On the other hand, there is also a possibility that the passenger may overlook a traffic light, so that the passenger is also informed of an alert for attention with respect to this possible oversight as much as possible. Accordingly, when the self-position estimation unit 106 finds a traffic light somewhere ahead the route, the autonomous driving control unit 101 notifies the passenger that there is the traffic light ahead the route. Also, when the peripheral status recognition unit 105 can recognize the colors of the traffic light and if the traffic light is red or yellow, the autonomous driving control unit 101 informs the passenger to that effect and prompts them to decelerate the speed. If the passenger does not decelerate the speed, the autonomous driving control unit 101 informs the passenger again of the alert for attention to prompt them to decelerate the speed.

Furthermore, where the route has been set, the passenger may be informed of whether the vehicle is running on an appropriate cruising lane in accordance with the route or not. The appropriate cruising lane means a lane for turning right or left or a lane appropriate for each destination before a branch. When the peripheral status recognition unit 105 can recognize the cruising lane and if the vehicle is running on a wrong cruising lane according to the route, an alert for attention is made and the passenger is informed to change to the correct lane. When the peripheral status recognition unit 105 cannot recognize the cruising lane, the passenger is just notified and prompted to check the cruising lane.

The above-described notice of alert for attention based on possible oversight of the traffic signs or the like should be made at least the first one time after the cancellation of the autonomous driving. Since the passenger may possibly be in an unfocused state immediately after the cancellation of the autonomous driving, notifying the passenger in this manner can prevent the passenger from overlooking the traffic signs or the like and also expect the effect of enhancing the passenger's consciousness to drive the vehicle by themselves.

Next, an explanation will be given about the notice control performed when the autonomous driving cannot be continued and the autonomous driving is forcibly canceled because, for example, the peripheral status recognition unit 105 cannot function sufficiently due to the weather such as fog or the peripheral status recognition unit 105 cannot recognize the lanes or the road edges due to a bad road surface condition.

In the above-described case, the occurrence of such condition cannot be known until just before the occurrence. So, when the peripheral status recognition unit 105 detects a sign of the occurrence by detecting, for example, degradation of recognition accuracy, the passenger is informed of an alert for attention to get ready for the driving operation immediately. When this happens, the reason why the autonomous driving cannot be continued should also be explained. The preparation for the driving operation is, for example, to place the hands on the steering wheel and place the foot on the brake pedal.

When the autonomous driving actually cannot be continued any longer and the autonomous driving is forcibly canceled, the passenger is notified of the cancellation of the autonomous driving in the same manner as the case of cancellation by the passenger's operation and the passenger is notified and prompted to perform the driving operation. Furthermore, since the driving assist function cannot be used unlike the normal cancellation, the passenger is informed and warned to that effect. For example, the passenger is notified that any preceding vehicle cannot be detected, lanes cannot be detected, and signs cannot be recognized.

Upon the normal autonomous driving cancellation, the driving assist is performed actively as described earlier on the basis of the information from the peripheral status recognition unit 105; however, if the passenger mistakenly recognizes that the driving assist function is working although the driving assist function is in an inoperable state, the passenger may possibly become careless. Therefore, by notifying the passenger of which function is effective and which function is not effective, the passenger is prevented from depending on the driving assist function which is not active.

On the other hand, when the autonomous driving is canceled by entering a place such as a sharp curve or a narrow street road where it is known in advance that the autonomous driving cannot be executed, when the autonomous driving will be canceled is known in advance. So, when the vehicle is approaching the relevant location, the passenger is notified in advance that the autonomous driving is to be canceled. The advance notice is given in a step-by-step manner on the basis of predicted arrival time and distance to reach that location.

By giving the notice in the step-by-step manner, it is possible to expect the effect of enhancing the passenger's consciousness to perform the driving operation. Furthermore, the notice prompts the passenger to perform the driving operation and also informs the passenger of things that they should watch out for when driving at the relevant location. For example, in the case of a narrow street road, the passenger should watch out for, for example, collisions with pedestrians and bicycles and pedestrians recklessly dashing out from obstacles. In the case of a sharp curve, the passenger is notified that they should decelerate sufficiently. The passenger may be notified of an appropriate driving speed by calculating that speed from a curvature of the road which is obtained by the self-position estimation unit 106. By informing the passenger of the above-mentioned information in advance, it is possible to smoothly switch to the manual driving mode by the passenger.

Incidentally, the passenger is also informed in advance of what will happen if the passenger does not perform the driving operation when the autonomous driving is forcibly canceled. Possible actions in this case would be, for example, that the vehicle may decelerate and eventually stop or may enter the state where no control is performed. Informing the passenger in this manner can expect the effect of enhancing the passenger's consciousness and making the passenger realize that they have no other choice but perform the driving operation.

Next, an explanation will be given about the notice control performed when the autonomous driving is canceled as a result of the passenger's driving operation during the autonomous driving. In such a case, both cases where the passenger has intentionally operated for whatever reason such as avoidance of danger and where the passenger has mistakenly operated are possible; however, it is difficult to judge which of these cases has caused the cancellation of the autonomous driving. In the former case, the passenger proactively performs the driving operation; however, in the latter case, there is a possibility that the passenger may not notice the cancellation of the autonomous driving and not perform the driving operation.

Therefore, the passenger is firstly notified that the autonomous driving is canceled and they need to perform the driving operation. This notice repeatedly informs the passenger until the driving operation monitor 102 confirms the operation of the steering wheel and the accelerator or brake operation and it is judged that the driving operation is performed. Informing the passenger in this manner prevents the uncontrolled state of the vehicle from continuing for long time.

Once it is confirmed that the driving operation is performed, the passenger is informed of the reason for cancellation of the autonomous driving. If the cancellation is caused by the passenger's mistaken operation, it can be expected that the above information will make the passenger watch out to not perform the same operation. Subsequently, whether the autonomous driving should be resumed or not is checked, so that the autonomous driving can be resumed by the passenger performing operations in accordance with guiding information. By doing so, the passenger can return to the autonomous driving without doing unnecessary operations such as redoing settings.

[Notice Control Processing for Autonomous Parking]

Figure 9:
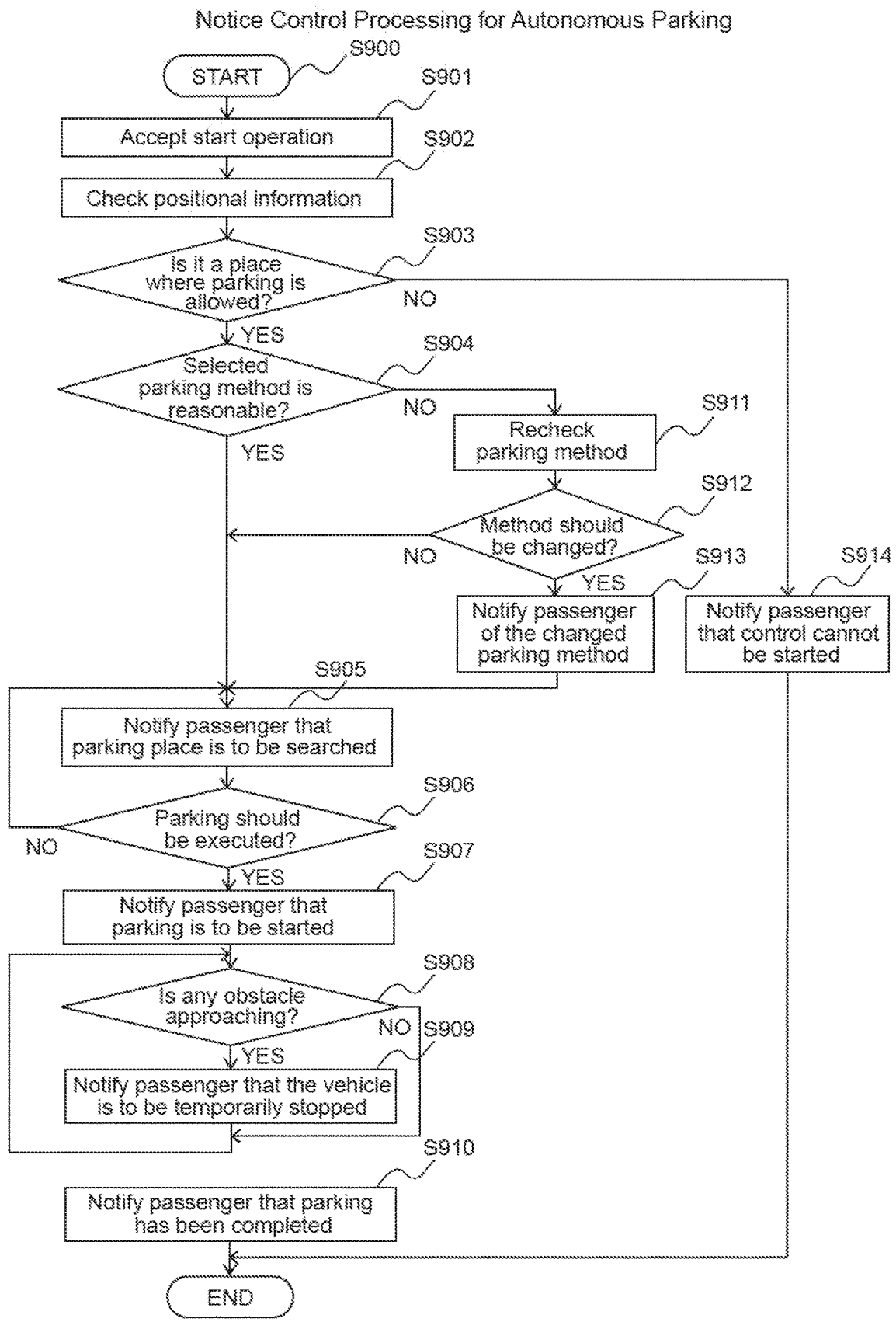
FIG. 9 is an example of a flowchart for explaining the notice control processing for autonomous parking.

FIG. 9 illustrates a flowchart for explaining the notice control processing associated with autonomous parking executed by the autonomous driving control apparatus 100. The autonomous parking is to park the vehicle at a parking place or parallel park the vehicle on a road without the passenger's driving operation. Regarding the notice control processing, when the autonomous parking is started in accordance with an autonomous parking start instruction from the autonomous control setting input unit 103, the passenger is notified that the autonomous parking is to be performed. Incidentally, the notice control processing associated with the start of the autonomous parking may be started as the self-position estimation unit 106 recognizes that the vehicle is in the vicinity of a predetermined parking point.

The autonomous parking can be executed only at a place where the vehicle can be parked. The vehicle cannot be parked, for example, on an expressway except for an emergency. So, when the autonomous parking start operation is performed (S901), the self-position estimation unit 106 checks a current position with the map information 108 and judges whether the current position is a place where the vehicle can be parked or not (S902). The place where the vehicle can be parked is, for example, within the parking place, a road with less than two lanes in each direction, or a lane closest to a road edge on a road with two or more lanes in each direction. In a case of other places or when the autonomous parking start operation is performed while the vehicle is running (S903: NO), the passenger is notified that the autonomous parking cannot be performed (S914). Incidentally, since it is possible that an unregistered parking place such as a temporarily provided parking place may be used, it may be designed that the autonomous parking control can be forced to start, except when the vehicle is running.

Next, whether the selected parking method is reasonable or not is judged (S904). When executing the autonomous parking, the passenger is made to select whether to park the vehicle at a parking space or parallel park the vehicle. Usually when parking a vehicle in a garage or a parking place, it means parking at the parking space; and when parking a vehicle on a road, it means parallel parking. Therefore, for example, when an instruction is given to parallel park the vehicle in a parking place, the following situation may happen: no place where the vehicle can be parallel parked can be found and parking cannot be executed; or the vehicle may be parked sideways by ignoring a parking space frame.

So, when it is judged that the selected parking method is not reasonable, for example, when parallel parking is selected although the vehicle is located in a parking place, or when parking the vehicle in a parking space is selected although the vehicle is located on a road (S904: NO), the passenger is notified that they should recheck the parking method (S911). If the parking method is changed (S912: YES), the passenger is notified of the selected parking method again (S913). Incidentally, it is possible that a space for parallel parking may be provided even if it is the parking place. So, it may be designed so that the passenger can select either parking method even when a parking method to be recommended can be judged.

Once the selection of the parking method is completed, the passenger is notified that the autonomous parking control is to be started. This notice informs the passenger that both the steering and the speed are controlled and the passenger does not have to perform the driving operation. Meanwhile, the passenger is also informed of a method for stopping the autonomous parking control, for example: if the brake operation is performed, the control will be stopped. So, the passenger is notified that the passenger should perform specified stop operation if they ever feel dangerous. By informing the passenger in this way, the passenger can be ready to deal with the situation immediately upon emergency and the passenger can be prevented from overestimating the autonomous parking control and failing to check the surrounding safety.

The autonomous parking control is also divided into some steps in the same manner as the control for overtaking and turning right or left at an intersection; and while the control is performed, the passenger is always notified of in which step the control is being operated. The first step is to run to find a space where the vehicle can be parked. Accordingly, when the autonomous parking is started, the passenger is informed that the autonomous driving is to be performed to find a parking place (S905). Incidentally, when the autonomous parking is started after the passenger has found the parking place by themselves, this step is omitted.

When the peripheral status recognition unit 105 discovers a place where the vehicle can be parked, the autonomous driving control unit 101 informs the passenger of that place as a candidate parking place and notifies the passenger whether to park the vehicle at that place or not (S906). When informing the passenger of the candidate parking place, the passenger may be notified of visual information by, for example, displaying it on a display. When the autonomous control setting input unit 103 receives a check instruction (S906: YES), operation to park the vehicle is started. Under this circumstance, the steering wheel turns substantially along with the operation to park the vehicle, the passenger is notified that they should watch out for the rotation of the steering wheel (S907).

Regarding the notice, the passenger is notified at least before starting parking; however, during the autonomous parking operation, the passenger may be warned about turning of the steering wheel including a turning direction every time the steering wheel actually turns. Incidentally, for example, if a pedestrian is approaching during the autonomous parking, the passenger is warned about it and also notified that the vehicle is to be temporarily stopped (S909). Once the entire control is completed and parking at the parking place is completed, the processing terminates by notifying the passenger of the completion of the autonomous parking (S910).

According to Embodiment 1 described above, the driving modes can be switched smoothly and it can be ensured that the passenger understands the driving operations controlled in the relevant driving mode and necessary driving operations.

The above description has explained that since the processing of the relevant flowchart terminates after performing the notice control in, for example, S212 of FIG. 2, S316 of FIG. 3, S412 of FIG. 4, S511 of FIG. 5, or S807 of FIG. 8, the aforementioned notice is executed only when it becomes necessary to perform the notice control for the first time. This is because once the driving operation by the passenger or the autonomous driving control unit 101 is executed, it is assumed that the passenger understands the current driving mode and it is unlikely that the passenger may subsequently mistakenly judge the current driving mode; and furthermore, if the notice control is performed every time, the passenger may possibly feel annoyed. However, if higher safety is required, it is possible to perform the notice control every time whenever the driving operation is required; and it is also possible to perform the notice control for a specified number of times after the driving operation is required for the first time, and then to not perform the notice control after that. Furthermore, if a specified time has elapsed after performing the notice control, it is also possible to perform the notice control again at the time of the next driving operation; and if a specified number of driving operations have elapsed after performing the notice control, it is possible to perform the notice control again at the time of the next driving operation; and it is also possible to perform various patterns of notice control such as combinations of the above-mentioned patterns of notice control.

Incidentally, the present invention is not limited to the aforementioned embodiments, and includes various variations. For example, the aforementioned embodiments have been described in detail in order to explain the invention in an easily comprehensible manner and are not necessarily limited to those having all the configurations explained above. Furthermore, part of the configuration of an embodiment can be replaced with the configuration of another embodiment and the configuration of another embodiment can be added to the configuration of a certain embodiment. Also, the configuration of another configuration can be added to, or deleted from, or replaced with, part of the configuration of each embodiment.

Furthermore, each of the aforementioned configurations, functions, processing units, processing steps, etc. may be implemented by hardware by, for example, designing part or all of such configurations, functions, processing units, and processing steps by using integrated circuits or the like.

Furthermore, control lines and information lines which are considered to be necessary for the explanation are illustrated; however, not all control lines or information lines are necessarily indicated in terms of products. Practically, it may be assumed that almost all components are connected to each other.

REFERENCE SIGNS LIST 001 cruise control device
002 driving operation device
100 autonomous driving control apparatus
101 autonomous driving control unit
102 driving operation monitor
103 autonomous control setting input unit
104 information notification unit
105 peripheral status recognition unit
106 self-position estimation unit
107 map information

The invention claimed is:

1. An autonomous driving control apparatus capable of switching between a manual driving mode which requires driving operation by a person in a vehicle, and an autonomous control mode which does not require the driving operation by the person in the vehicle, and a driving assist mode which assists driving operations by performing some of the driving operations by the person in the vehicle, the autonomous driving control apparatus comprising:
   an autonomous driving control unit that controls the vehicle in the autonomous control mode; and
   an information notification unit that gives notice to the person in the vehicle, wherein
      when the driving operation by the person is required after switching from the autonomous control mode to the manual driving mode, the autonomous driving control unit performs a first notice out of two notices which cause information notification unit to give notice that the driving operation by the person is required,
      the autonomous driving control unit is configured, when a curve is approaching for a first time after cancellation of the autonomous driving, to notify by the first notice control the passenger that the curve is approaching and that steering is required,
      the autonomous driving control unit is also configured to judge that steering by the passenger is required for the first time after switching from the autonomous control mode to the manual driving mode,
      the judgment is based on searching for a point along a traveling pathway where a steering control causes a steering angle to change for a specified amount or more from a current steering angle, and
      the autonomous driving control unit is configured to perform the first notice control before the vehicle reaches the point, when the driving operation is required for a first time.

2. The autonomous driving control apparatus according to claim 1,
   wherein the driving operation performed by the person in the vehicle according to the first notice control is at least one of steering of a specified angle, and acceleration or deceleration.

3. The autonomous driving control apparatus according to claim 1, further comprising a peripheral status recognition unit that recognizes a peripheral status of the vehicle,
   wherein the autonomous driving control unit judges whether the driving operation by the person in the vehicle to perform the first notice control is required or not, on the basis of the peripheral status recognized by the peripheral status recognition unit.

4. The autonomous driving control apparatus according to claim 1, further comprising:
   a storage unit that stores map information; and
   a self-position estimation unit that estimates a position of the vehicle,
   wherein the autonomous driving control unit judges whether the driving operation to perform the first notice control is required or not, on the basis of the position of the vehicle estimated by the self-position estimation unit and the map information.

5. The autonomous driving control apparatus according to claim 1,
   wherein when driving control by the autonomous driving control unit is performed, the autonomous driving control unit performs a second notice control to cause the information notification unit to give notice that the driving control is to be performed by the autonomous driving control unit.

6. The autonomous driving control apparatus according to claim 5,
   wherein the driving operation to perform the second notice control is steering of a specified angle, or acceleration or deceleration of a specified speed.

* * * * *